(12) United States Patent
Eoh et al.

(10) Patent No.: US 11,709,499 B2
(45) Date of Patent: Jul. 25, 2023

(54) CONTROLLING METHOD FOR ARTIFICIAL INTELLIGENCE MOVING ROBOT

(71) Applicant: LG ELECTRONICS INC., Seoul (KR)

(72) Inventors: Gyuho Eoh, Seoul (KR); Seungwook Lim, Seoul (KR); Dongki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 16/660,010

(22) Filed: Oct. 22, 2019

(65) Prior Publication Data
US 2020/0125113 A1    Apr. 23, 2020

(30) Foreign Application Priority Data

Oct. 22, 2018    (KR) .................. 10-2018-0125761

(51) Int. Cl.
*G05D 1/02*    (2020.01)
*B25J 9/00*    (2006.01)
(Continued)

(52) U.S. Cl.
CPC .......... *G05D 1/0274* (2013.01); *B25J 9/0003* (2013.01); *B25J 9/163* (2013.01);
(Continued)

(58) Field of Classification Search
CPC ... G05D 1/0274; G05D 1/0246; B25J 9/0003; B25J 9/163; B25J 9/1697; B25J 13/089
See application file for complete search history.

(56) References Cited

U.S. PATENT DOCUMENTS

| | | | |
|---|---|---|---|
| 10,300,603 B2* | 5/2019 | Gorshechnikov | G06N 3/008 |
| 2006/0165276 A1* | 7/2006 | Hong | G05D 1/0272 |
| | | | 382/153 |

(Continued)

FOREIGN PATENT DOCUMENTS

| | | |
|---|---|---|
| JP | H07-281748 | 10/1995 |
| JP | 2018-500636 | 1/2018 |

(Continued)

OTHER PUBLICATIONS

Korean Office Action dated Nov. 27, 2019.
Korean Notice of Allowance dated May 25, 2020 issued in Application No. 10-2018-0125761.

*Primary Examiner* — Nicholas Kiswanto

(74) *Attorney, Agent, or Firm* — Ked & Associates LLP

(57) ABSTRACT

A controlling method for an artificial intelligence moving robot according to an aspect of the present disclosure includes: checking nodes within a predetermined reference distance from a node corresponding to a current position; determining whether there is a correlation between the nodes within the reference distance and the node corresponding to the current position; determining whether the nodes within the reference distance are nodes of a previously learned map when there is no correlation; and registering the node corresponding to the current position on the map when the nodes within the reference distance are determined as nodes (Continued)

of the previously learned map, thereby being able to generate a map in which the environment of a traveling section and environmental changes are appropriately reflected.

9 Claims, 18 Drawing Sheets

(51) Int. Cl.
    *B25J 9/16*     (2006.01)
    *B25J 13/08*     (2006.01)
    *G06V 10/764*     (2022.01)
    *G06V 10/44*     (2022.01)
    *G06V 20/10*     (2022.01)

(52) U.S. Cl.
    CPC ........... *B25J 9/1697* (2013.01); *B25J 13/089* (2013.01); *G05D 1/0246* (2013.01); *G06V 10/44* (2022.01); *G06V 10/454* (2022.01); *G06V 10/764* (2022.01); *G06V 20/10* (2022.01)

(56) References Cited

U.S. PATENT DOCUMENTS

| | | | |
|---|---|---|---|
| 2013/0216098 A1* | 8/2013 | Hasegawa | G06T 7/246 |
| | | | 382/103 |
| 2015/0269439 A1* | 9/2015 | Versace | G06T 7/194 |
| | | | 382/103 |
| 2016/0005229 A1* | 1/2016 | Lee | G06F 3/0488 |
| | | | 345/419 |
| 2018/0120116 A1* | 5/2018 | Rombouts | G05D 1/0274 |
| 2019/0133397 A1* | 5/2019 | Choe | A47L 9/2852 |
| 2020/0050213 A1* | 2/2020 | Lim | G05D 1/0246 |

FOREIGN PATENT DOCUMENTS

| | | |
|---|---|---|
| KR | 10-2010-0104581 | 9/2010 |
| KR | 10-2017-0087387 | 7/2017 |
| KR | 10-2017-0095840 | 8/2017 |
| KR | 10-2018-0024325 | 3/2018 |
| KR | 10-2018-0043606 | 4/2018 |
| KR | 10-2018-0043753 | 4/2018 |

* cited by examiner

CONTROLLING METHOD FOR ARTIFICIAL INTELLIGENCE MOVING ROBOT

CROSS-REFERENCE TO RELATED APPLICATION

This application claims the priority benefit of Korean Patent Application No. 10-2018-0125761, filed on Oct. 22, 2018 in the Korean Intellectual Property Office, the entire disclosure of which is incorporated herein by reference.

FIELD OF THE INVENTION

The present disclosure relates to a moving robot and a method of controlling the moving robot and, more particularly, to a technology of enabling a robot to generate or learn a map or recognize a position in the map.

RELATED ART

A robot has been developed for the industry and has taken charge of a portion of factory automation. Recently, as the applied field using robots increasingly expands, a medical robot, an aerospace robot, etc. are developed and a domestic robot that can be used at common hole is also manufactured. A robot that can travel by itself of these robots is called a moving robot.

A robot cleaner is representative of moving robots that are used at home. A robot cleaner is a device that cleans a predetermined region by suctioning dust or dirt around it while traveling through the region by itself.

Since a moving robot can move by itself, it can freely move. Further, the moving robot is equipped with several sensors to avoid obstacles, etc. while traveling, it can travel while avoiding obstacles.

It is required to accurately generate a map of a traveling section in order to perform set tasks such as cleaning and it is required to accurately find out the current position of a moving robot on the map in order to move to a predetermined position in the traveling section.

To this end, various methods of continuously finding out the current position based on traveling information at a straight forward position of a moving robot (information about a movement direction and a movement speed or comparison of floor pictures continuously taken, etc.) while the moving robot continuously moves have been studied. Further, studies about various methods of enabling a moving robot to generate and learn a map by itself are being conducted.

A prior art document 1 (Korean Patent Application Publication No. 10-2010-0104581, published on Sep. 29, 2010) has disclosed a technology of generating a 3D map from feature points extracted from images taken within a traveling section and of finding out an unknown current position using a feature point based on an image taken by a camera at the current position.

The technology disclosed in the prior document 1 generates a 3D map from feature points extracted from images taken within a traveling section and extracts three or more pairs of feature points matched to the feature points in the 3D map from the feature points in the image taken an unknown current position. Thereafter, the technology calculates distances from three or more feature points using 2D coordinates of three or more feature points matched in the image taken at the current position, 3D coordinates of three or more feature points on the 3D map, and information of the focal distance of the camera at the current position, and then recognizes the current position from the distances.

Further, a technology of taking images while horizontally rotating the camera at the current position when three or more feature points matched with feature points on the 3D image are not extracted from the image taken at the current position has been disclosed in the prior art document 1.

As in the prior art document 1, the method of recognizing a specific point as the position of a feature point by comparing any one image of the same part in a traveling section with a recognition image has a problem that the accuracy in estimation of the current position may be changed by environmental changes such as a change of illumination due to whether a light is turned on/off or the incident angle or the amount of sunlight in the traveling section.

A prior art document 2 (Korean Patent Application Publication No. 10-2017-0087387, published on Jul. 28, 2017) has disclosed a cleaning method through management of several map and position re-recognition.

In the prior art document 2, similarity is determined by comparing information acquired from a sensor with at least one map of a plurality of types of stored maps in accordance with a predetermined algorithm, at least one map is selected, and the position of a cleaning robot is recognized in accordance with the selected map, thereby performing cleaning.

In the prior art document 2, a map is selected by simply storing several maps and geometrically comparing the maps with the current environment.

SUMMARY OF THE INVENTION

As in the prior art document 1, the method of recognizing a specific point as the position of a feature point by comparing any one image of the same part in a traveling section with a recognition image has a problem that the accuracy in estimation of the current position may be changed by environmental changes such as a change of illumination due to whether a light is turned on/off or the incident angle or the amount of sunlight in the traveling section and a change of the position of objects. An object of the present disclosure is to provide a technology of generating a map that is strong against these environmental changes.

As in the prior art document 2, the method of selecting any one from a plurality of maps has a problem that even if there is useful information in the other maps not selected, it is impossible to use the information. Further, since only one is selected from a plurality of made maps, it is impossible to cope with some changes in an environment. An object of the present disclosure is to provide a technology of generating one map that can cope with various environmental changes such as changes of light, illumination, a time period, and the position of an object.

An object of the present disclosure is to provide a technology of generating a map that optimizes the map by sensing environmental changes and updating the map in accordance with predetermined references.

An object of the present disclosure is to provide a technology of efficiently and accurately recognizing a position in a traveling section by increasing the success rate in recognition of the current position of a moving robot and by estimating the current position with higher reliability.

In order to achieve the objects described above or other objects, a method of controlling a moving robot according to an aspect of the present disclosure can generate a map that is strong against environmental changes by repeatedly learning various environmental changes such as changes of light, illumination, a time period, and the position of an object.

In order to achieve the objects described above or other objects, a method of controlling a moving robot according to an aspect of the present disclosure can optimize a map by sensing environmental changes and updating the map in accordance with predetermined references.

In order to achieve the objects described above or other objects, a method of controlling a moving robot according to an aspect of the present disclosure can perform efficient learning cleaning based on one map that can cope with various environmental changes.

In order to achieve the objects described above or other objects, a method of controlling a moving robot according to an aspect of the present disclosure includes: checking nodes within a predetermined reference distance from a node corresponding to a current position; determining whether there is a correlation between the nodes within the reference distance and the node corresponding to the current position; determining whether the nodes within the reference distance are nodes of a previously learned map when there is no correlation; and registering the node corresponding to the current position on the map when the nodes within the reference distance are determined as nodes of the previously learned map, thereby being able to generate a map in which the environment of a traveling section and environmental changes are appropriately reflected.

Further, the method of controlling a moving robot according to an aspect of the present disclosure further includes: determining whether there is a node having a difference of a reference angle or less from the current direction of the robot in the nodes within the reference distance when the correlation exists or when the nodes within the reference distance are not determined as nodes in the map; and registering the node on the map when there is no node having a difference of a reference angle or less from the current direction of the robot, thereby being able to generate a map in which meaningful environmental changes are reflected.

Further, the method of controlling a moving robot according to an aspect of the present disclosure includes: when there are nodes having a difference of the reference angle or less from the current direction of the robot, determining whether the correlations of the node are consistent; and when correlations of the node corresponding to the current position and a node having a difference of the reference angle or less from the current direction of the robot are not consistent, registering the node on the map, in when correlations of the node corresponding to the current position and a node having a difference of the reference angle or less from the current direction of the robot are consistent, the node corresponding to the current position is not registered on the map, thereby being able to prevent map update due to a small environmental change.

In order to achieve the objects described above or other objects, a method of controlling a moving robot according to an aspect of the present disclosure includes: generating a learning map based on initial cleaning traveling; performing learning cleaning while traveling based on the learning map; performing position estimation based on the learning map when information acquired in the performing of learning cleaning and pre-stored information in the learning map are the same; and updating the learning map by additionally registering a node based on the information acquired in the performing of learning cleaning on the learning map when the information acquired in the performing of learning cleaning and the pre-stored information in the learning map are not the same, thereby being able to generate a map in which the environment of a traveling section and environmental changes are appropriately reflected.

Nodes to be registered are registered on the learning map when the number of nodes to be registered is the predetermined number of pieces or more, and if not so, the nodes to be registered are not registered on the learning map, thereby being able to update a map only when an environmental change is a predetermined level or more.

Further, position estimation is performed based on the updated learning map, thereby being able to improve position estimation accuracy.

The updating of the learning map may include: checking nodes within a predetermined reference distance from a node corresponding to a predetermined position during traveling; determining whether there is a correlation between the nodes within the reference distance and the node corresponding to the predetermined position; determining whether the nodes within the reference distance are nodes of a previously learned learning map when there is no correlation; and registering the node corresponding to the predetermined position on the learning map when the nodes within the reference distance are determined as nodes of the learning map.

Further, the method further includes: determining whether there is a node having a difference of a reference angle or less from the current direction of the robot in the nodes within the reference distance when the correlation exists or when the nodes within the reference distance are not determined as nodes in the map; and registering the node on the map when there is no node having a difference of a reference angle or less from the current direction of the robot, thereby being able to update a map by reflecting meaningful environmental changes.

Further, the method further includes: determining whether the correlation of a node is consistent when there is the node having a difference of a reference angle or less from the current direction of the robot; and not registering a node corresponding to the current position when the correlations of the node corresponding to the predetermined position and the node having a difference of a reference angle or less from the current direction of the robot are consistent, and registering the node on the map when the correlations of the node corresponding to the predetermined position and the node having a difference of a reference angle or less from the current direction of the robot are not consistent, thereby being able to prevent map update due to a small environmental change.

In order to achieve the objects described above or other objects, a method of controlling a moving robot according to an aspect of the present disclosure includes: checking nodes within a predetermined reference distance from a node corresponding to a current position; registering the node corresponding to the current position on a map when the node corresponding to the current position corresponds to an existing region with a changed environment; and registering the node corresponding to the current position on a map when the node corresponding to the current position on a map corresponds to a new region and an additional reference is satisfied, thereby being able to generate and update a map in which the environment of a traveling section and environmental changes are appropriately reflected.

In this case, when the node corresponding to the current position does not exist with a node within the reference distance, there is no correlation, and a node within the reference distance is not a node of a previously learned map, it is possible to determine that it is a new region. Further, when the node corresponding to the current position does not exist with a node within the reference distance, there is no correlation, and a node within the reference distance is a node of a previously learned map, it is possible to determine that it is an existing node with the environment changed.

Meanwhile, the additional reference may include whether there is a node having a difference of a reference angle or less from the current direction of the robot in the nodes within the reference distance.

Meanwhile, the additional reference may include whether correlations of the node corresponding to the current node and the node having a difference of a reference angle or less from the current direction of the robot are consistent.

DESCRIPTION OF EXEMPLARY EMBODIMENTS

Figure 1:
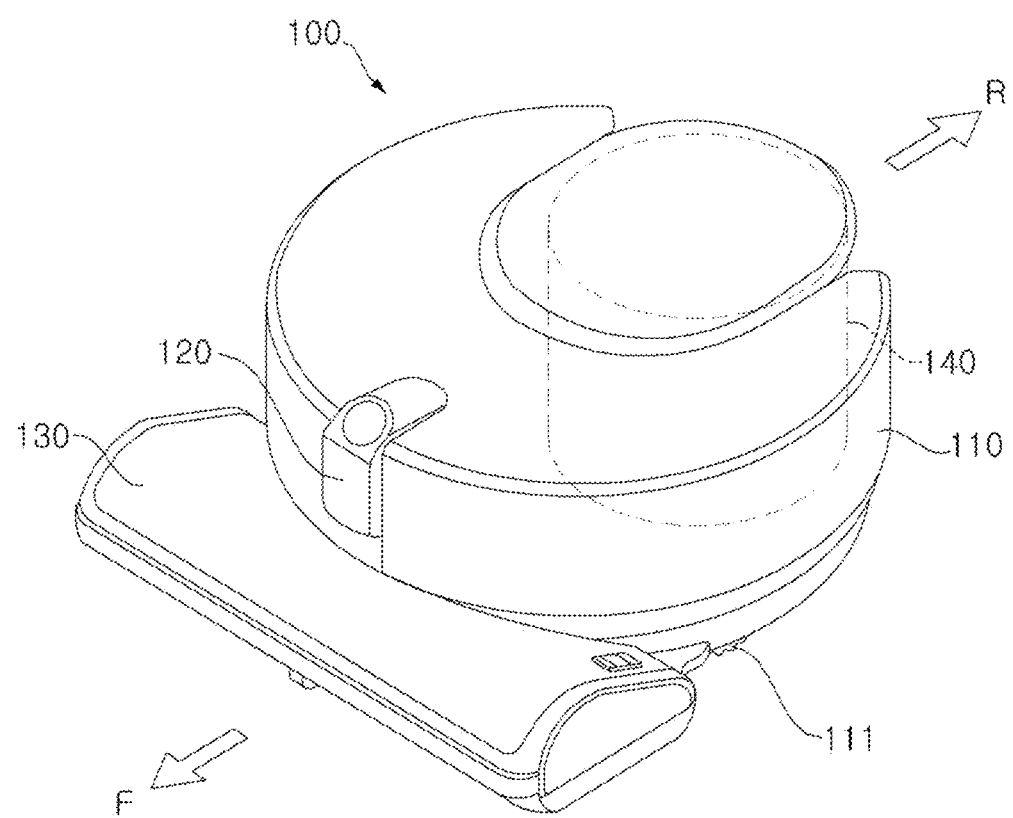
FIG. 1 is a perspective view of a moving robot according to an embodiment of the present disclosure.

Embodiments of the present disclosure are described hereafter in detail with reference to the accompanying drawings. However, it should be noted that the present disclosure is not limited to the embodiments and may be modified in various ways.

For clear and brief description of the present disclosure, parts not related to the description are not shown in the drawings and the same or similar components are indicated by the same reference numerals throughout the specification.

Terms "module" and "unit" that are used for components in the following description are used only for the convenience of description without having specifically important meanings or functions. Accordingly, the terms "module" and "unit" may be used in combination.

A moving robot 100 according to an embodiment of the present disclosure means a robot that can move by itself using wheels, etc., and may be a housemaid robot, a robot cleaner, etc. Hereafter, a robot cleaner having a cleaning function of moving robots is exemplified and described with reference to the drawings, but the present disclosure is not limited thereto.

Figure 2:
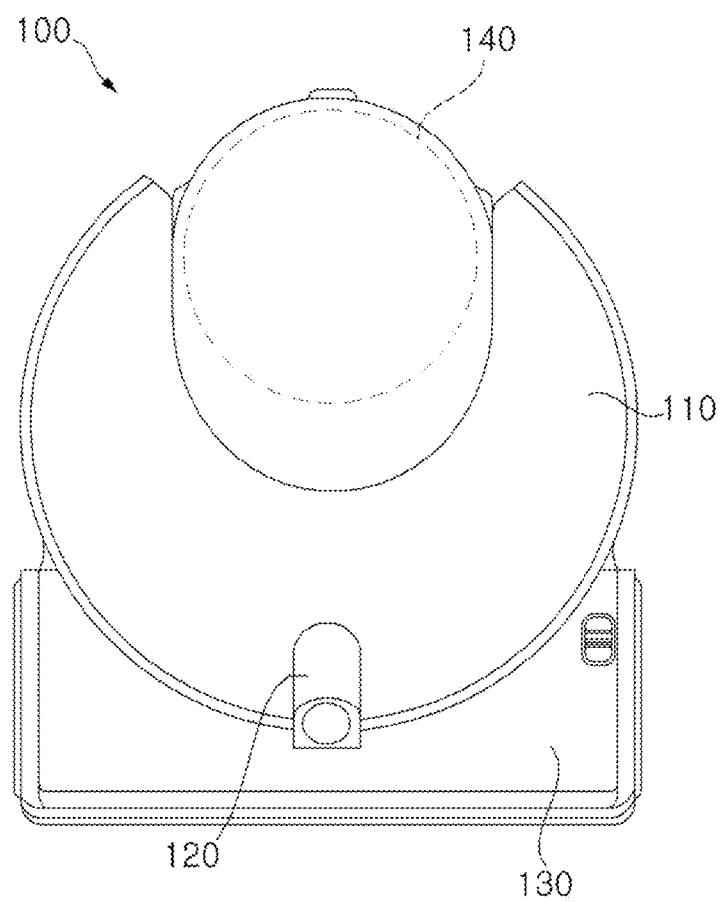
FIG. 2 is a plan view of the moving robot of FIG. 1.
Figure 3:
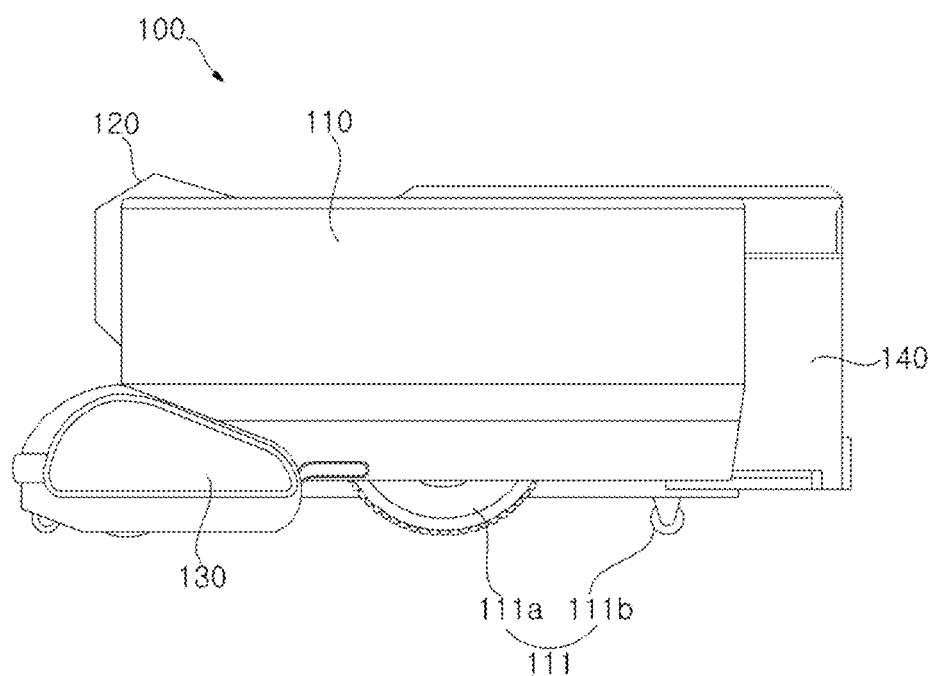
FIG. 3 is a side view of the moving robot of FIG. 1.

FIG. 1 is a perspective view of a moving robot according to an embodiment of the present disclosure, FIG. 2 is a plan view of the moving robot of FIG. 1, and FIG. 3 is a side view of the moving robot of FIG. 1.

Referring to FIGS. 1 to 3, a moving robot 100 can travel through a predetermined region by itself. The moving robot 100 can perform a function of cleaning a floor. The cleaning a floor stated herein includes suctioning dust (including dirt) on the floor or wiping the floor with a rag.

The moving robot 100 includes a main body 110. The main body 110 includes a cabinet forming the external appearance. The moving robot 100 may include a suction unit 130 and a dust container 140 that are disposed in the main body 110. The moving robot 100 includes an image acquisition unit 120 that senses information about the environment of the moving robot. The moving robot 100 includes a driving unit 160 that moves the main body. The moving robot 100 includes a controller 181 for controlling the moving robot 100. The controller is disposed in the main body 110.

The driving unit 160 includes a wheel unit 111 for driving the moving robot 100. The wheel unit 111 is disposed on the main body 110. The moving robot 100 can be moved or rotated forward, rearward, left, and right by the wheel unit 111. As the controller controls driving of the wheel unit 111, the moving robot 100 can autonomously travel on a floor. The wheel unit 111 includes main wheels 111a and a sub-wheel 111b.

The main wheels 111a are disposed on both sides of the main body 110 and are configured to be able to rotate in one direction or the other direction in accordance with a control signal from the controller. The main wheels 111a may be configured to be able to be independently driven. For example, the main wheels 111a may be driven by different motors, respectively.

The sub-wheel 111b supports the main body 110 together with the main wheels 111a and assists traveling of the moving robot 100 by the main wheels 111a. The sub-wheel 111b may be disposed at a suction unit 130 to be described below.

The suction unit 130 may be disposed in a shape protruding from the front F of the main body 110. The suction unit 130 is provided to suction air including dust.

The suction unit 130 may have a shape protruding to both left and the right sides from the front of the main body 110. The front end of the suction unit 130 may be disposed at a position spaced forward apart from a side of the main body 110. The both left and right sides of the suction unit 130 may be disposed respectively at positions spaced apart to both left and right sides from the main body 110.

The main body 110 is formed in a circular shape and both sides of the rear end of the suction unit 130 respectively protrudes to both left and right sides from the main body 110, so an empty space, that is, a gap can be formed between the main body 110 and the suction unit 130. The empty space is a space between the both left and right ends of the main body 110 and the both left and right ends of the suction unit 130 and has a shape recessed inside the moving robot 100.

The suction unit 130 may be detachably coupled to the main body 110. When the suction unit 130 is separated from the main body 110, a rag module (not shown) may be detachably coupled to the main body 110 instead of the separated suction unit 130.

The image acquisition unit 120 may be disposed on the main body 110. The image acquisition unit 120 may be disposed on the front F of the main body 110. The image acquisition unit 120 may be disposed to overlap the suction unit 130 in the up-down direction of the main body 110. The image acquisition unit 120 may be disposed over the suction unit 130.

The image acquisition unit 120 can sense obstacles around the moving robot 100. The image acquisition unit 120 can sense forward obstacles or configuration of the floor and objects so that the suction unit 130 positioned at the front of the moving robot 100 does not hit obstacles. The image acquisition unit 120 may additionally perform other sensing functions to be described below other than the sensing function described above.

The main body 110 may have a dust container accommodation portion (not shown). The dust container 140 that separates and collects dust in the suctioned air is detachably coupled to the dust container accommodation portion. The dust container accommodation portion may be formed on the rear R of the main body 110. A portion of the dust container 140 is accommodated in the dust container accommodation portion and the other portion of the dust container 140 may be formed to protrude toward the rear R of the main body 110.

An inlet (not shown) through which air including dust flows inside and an outlet (not shown) through which air with dust separated is discharged are formed at the dust container 140. When the dust container 140 is mounted in the dust container accommodation portion, the inlet and the outlet of the dust container 140 are configured to respectively communicate with a first opening (not shown) and a second opening (not shown) formed on the inner wall of the dust container accommodation portion.

A suction channel (not shown) that guides air from a suction port of the suction unit 130 to the first opening is provided. An exhaust channel (not shown) that guides air from the second opening to an exhaust port (not shown) open toward the outside is provided.

The air including dust and suctioned through the suction unit 130 flows into the dust container 140 through the intake channel in the main body 110, and the air and the dust are separated through a filter or a cyclone of the dust container 140. The dust is collected in the dust container 140 and the air is discharged from the dust container 140, sent through the exhaust channel in the main body 110, and then finally discharged outside through the exhaust port.

Figure 4:
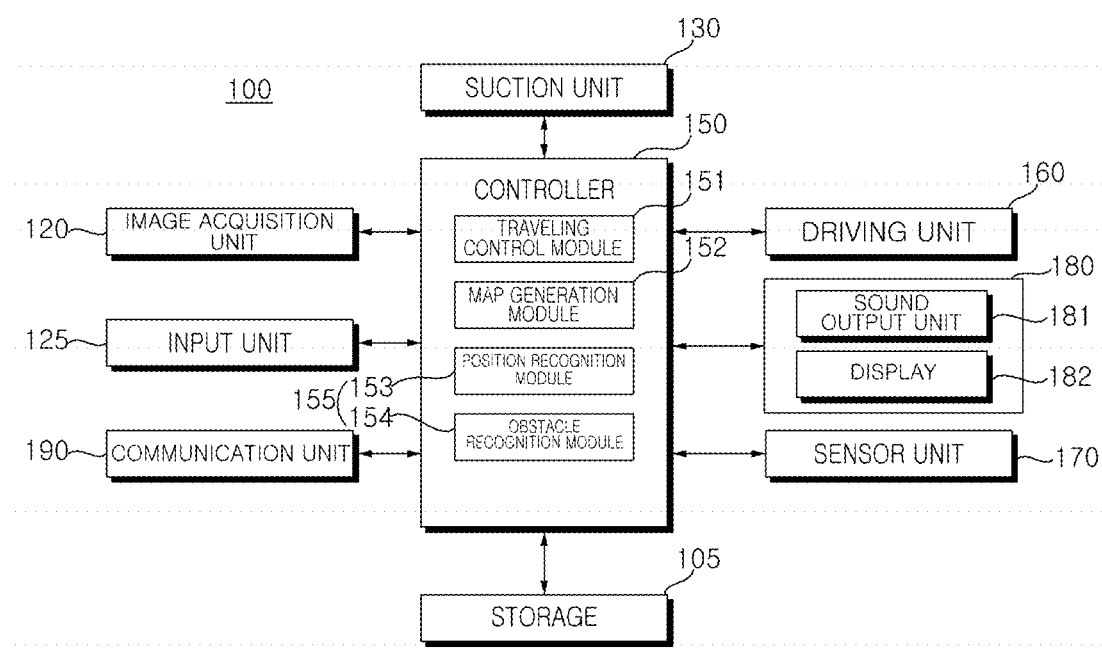
FIG. 4 is a block diagram showing a control relationship among main components of a moving robot according to an embodiment of the present disclosure.

FIG. 4 is a block diagram showing a control relationship among main components of a moving robot according to an embodiment of the present disclosure.

Referring to FIGS. 1 to 4, the moving robot 100 includes the main body 110 and the image acquisition unit 120 that acquires image around the main body 110.

The moving robot 100 includes a driving unit 160 that moves the main body 110. The driving unit 160 includes at least one wheel unit 111 that moves the main body 110. The driving unit 160 includes a driving motor (not shown) that is connected to the wheel unit 111 and rotates the wheel unit 111.

The image acquisition unit 120 that photographs a traveling section may include a camera module. The camera module may include a digital camera. The digital camera may include at least one optical lens, an image sensor (e.g., a CMOS image sensor) including several photodiodes (e.g., pixels) in which images are formed by light that has passed through the optical lens, and a digital signal processor (DSP) that forms an image based on signals output from the photodiodes. The digital signal processor can generate not only still images, but also moving images composed of frames composed of still images.

Such a camera may be installed as several pieces at predetermined respective positions for photographing efficiency. An image taken by the camera can be used to recognize the kinds of matters such as dust, hairs, and a floor that exist in a corresponding space and to check whether cleaning has been performed, or a point in time of cleaning.

The camera can photograph the situation of obstacles or a cleaning region that exists in the front area in the traveling direction of the moving robot 100.

According to an embodiment of the present disclosure, the image acquisition unit 120 can acquire a plurality of images by continuously photographing the surrounding of the main body 110 and the plurality of acquired images can be stored in a storage 105.

The moving robot 100 can increase accuracy in space recognition, position recognition, and obstacle recognition using a plurality of images or can increase accuracy in space recognition, position recognition, and obstacle recognition by using effective data by selecting one or more images from the plurality of images.

Further, the moving robot 100 may include a sensor unit 170 including sensors that sense various data related to the motion and the state of the moving robot.

For example, the sensor unit 170 may include an obstacle sensor that senses obstacles in the front area. Further, the sensor unit 170 may further include a steep portion sensor that senses whether there is a steep portion on the floor in a traveling section, and a bottom camera sensor that acquires images of a floor.

The obstacle sensor may include an infrared sensor, an ultrasonic sensor, and RF sensor, a geomagnetic sensor, a PSD (Position Sensitive Device) sensor, etc.

Meanwhile, the positions and kinds of the sensors included in the obstacle sensor may depend on the kind of the moving robot and the obstacle sensor may further include more various sensors.

Meanwhile, the sensor unit 170 may further include a motion sensor that senses motions of the moving robot 100 according to driving of the main body 110 and outputs motion information. For example, a gyro sensor, a wheel sensor, an acceleration sensor, etc. may be used as the motion sensor.

The gyro sensor senses a rotational direction and a rotational angle when the moving robot 100 is moved in accordance with a driving mode. The gyro sensor detects an angular speed of the moving robot 100 and outputs a voltage value that is proportioned to the angular speed. The controller 150 calculates a rotational direction and a rotational angle using the voltage value that is output from the gyro sensor.

The wheel sensor is connected to the wheel unit 100 and senses the number of revolutions of the wheels. In this configuration, the wheel sensor may be a rotary encoder.

The acceleration sensor senses a speed change of the moving robot 100, for example, changes of the moving robot 100 according to a start, a stop, a direction change, and a collision with an object.

Further, the acceleration sensor may be disposed in the controller 150 and can sense a speed change of the moving robot 100.

The controller 150 can calculate a position change of the moving robot 100 based on motion information output from the motion sensor. The position is a relative position to an absolute position using image information. The moving robot can improve position recognition performance using image information and obstacle information through such relative position recognition.

Meanwhile, the robot 100 may include a power supplier (not shown) that has a chargeable battery and supplies power into the moving robot.

The power suppliers can supply driving power and operation power to each component of the moving robot 100, and when the remaining power is insufficient, the power supplier can be charged with power that is supplied from a cradle (not shown).

The moving robot 100 may further include a battery sensing unit (not shown) that senses the charge state of the battery and transmits the sensing result to the controller 150. The battery is connected with the battery sensing unit, so the remains and the charge state of the battery are transmitted to the controller 150. The remains of the battery can be shown on a display 182 of an output unit 180.

Further, the moving robot 100 includes an input unit 125 through which turning-on/off or various instructions can be input. The input unit 125 may include a button, a dial, a touch screen or the like. The input unit 125 may include a microphone for receiving voice instructions input from a user. It is possible to receive various control instructions for the general operation of the moving robot 100 through the input unit 125.

Further, the moving robot 100 includes the output unit 180, so it is possible to display reservation information, a battery state, an operation mode, an operation state, an error state, etc. using images or output them using sounds.

The output unit 180 may include a sound output unit 181 that outputs audio signals. The sound output unit 181 can output notification messages such as an alarm, an operation mode, an operation state, and an error state using sounds. The sound output unit 181 can convert and output an electrical signal from the controller 150 into an audio signal. To this end, a speaker, etc. may be provided.

Further, the output unit 180 may further include the display 182 that displays reservation information, a charge state, an operation mode, an operation state, an error state, etc. using images.

Referring to FIG. 4, the moving robot 100 includes the controller 150 that processes and determines various items of information including recognition of a current position, and the storage 105 that stores various data. Further, the moving robot 100 may further include a communication unit 190 that transmits/receives data to/from an external terminal.

The external terminal has applications for controlling the moving robot 100, and can display a map about a traveling section to be cleaned by the moving robot 100 and designate regions such that a specific region on the map is cleaned by executing the applications. The external terminal, for example, may be a remote controller, a PDA, a laptop, a smartphone, a tablet, etc. including applications for setting a map.

The external terminal can display the current position of the moving robot together with a map and display information about a plurality of regions by communicating with the moving robot 100. Further, the external terminal updates and displays the position in accordance with traveling of the moving robot.

The controller 150 controls the general operation of the moving robot 100 by controlling the image acquisition unit 120, the input unit 125, the driving unit 160, the suction unit 130, etc. constituting the moving robot 100.

The controller 150 can process a voice input signal of a user received through the microphone of the input unit 125 and perform a voice recognition process. Depending on embodiments, the moving robot 100 may include a voice recognition module that performs voice recognition inside or outside the controller 150.

Depending on embodiments, the moving robot 100 may perform simple voice recognition by itself, and high-order voice recognition such as processing of natural languages may be performed in a server 70.

The storage 105, which records various items of information for controlling the moving robot 100, may include a volatile or nonvolatile recording medium. The recording medium, which stores data that can be read by a microprocessor, may include an HDD (Hard Disk Drive), an SSD (Solid State Disk), an SDD (Silicon Disk Drive), a ROM, a RAM, a CD-ROM, a magnetic tape, a floppy disk, an optical data storage, etc.

Further, a map about a traveling section may be stored in the storage 105. The map may be input by an external terminal, a server, etc. that can exchange information with the moving robot 110 through wire or wireless communication or may be generated by the moving robot 100 itself through learning.

The positions of rooms in a traveling section may be shown on the map. Further, the current position of the moving robot 100 can be shown on the map and the current position of the moving robot 100 on the map can be updated during traveling. The external terminal stores a map that is the same as the map stored in the storage 105.

The storage 105 can store cleaning history information. The cleaning history information may be generated ever time cleaning is performed.

The map about a traveling section stored in the storage 105, which is a datum storing predetermined information of a traveling section in a predetermined format, may be a navigation map that is used for traveling during cleaning, a SLAM (Simultaneous localization and mapping) map that is used for position recognition, a learning map that stores corresponding information when the moving robot hits an obstacle, etc., and that is used for learning cleaning, a turning position map that is used for turning position recognition, an obstacle recognition map in which information about recognized obstacles is stored, etc.

The map may mean a node map including a plurality of nodes. In this case, the node means data showing any one position on the map that corresponds to a point that is any one position in a traveling section.

The node map may include node information that is various data corresponding to respective nodes. For example, the node information may include a position information, image information acquired at positions corresponding to nodes, etc. The position information $(X, Y, \theta)$ may include an X-coordinate (X) of the robot, a Y-coordinate (Y) of the robot, and direction information ($\theta$) at a corresponding node. The direction information ($\theta$) may be referred to as angle information, etc.

On the other hand, it is possible to separately store and manage maps in the storage 105 for respective uses, but maps may not be clearly discriminated for respective uses. For example, a plurality of items of information may be stored on one map to be able to be used for at least two or more uses.

The controller 150 may include a traveling control module 151, a map generation module 152, a position recognition module 153, and an obstacle recognition module 154.

Referring to FIGS. 1 to 4, the traveling control module 151, which controls traveling of the moving robot 100, controls driving of the driving unit 160 in accordance with traveling setting. Further, the traveling control module 151 can find out the traveling path of the moving robot 100 based on the operation of the driving unit 160. For example, the traveling control module 151 can find out the current or past movement speed, the traveling distance, etc. of the moving robot 100 based on the rotational speed of the wheel unit 111, and the position of the moving robot 100 on the map can be updated based on the traveling information of the moving robot 100 found out as described above.

The map generation module 152 can generate a map of a traveling section. The map generation module 152 can make a map by processing images acquired through the image acquisition unit 120. That is, it is possible to make a cleaning map corresponding to a cleaning region.

Further, the map generation module 152 can recognize turning positions by processing images acquired through the image acquisition unit 120 and liking the images with a map.

The position recognition module 153 estimates and recognizes a current position. The position recognition module 153 can estimate and recognize a current position even if the position of the moving robot 100 is suddenly changed, by finding out a position in cooperation with the map generation module 152 using the image information of the image acquisition unit 120.

Further, the position recognition module 153 can recognize the property of a currently positioned region, that is, the position recognition module 153 can recognize a space.

The moving robot 100 can recognize a position while continuously traveling through the position recognition module 153, and can learn a map and estimate a current position, etc. through the map generation module 152 and the obstacle recognition module 154 without the position recognition module 153.

While the moving robot 100 travels, the image acquisition unit 120 acquires images around the moving robot 100. Hereafter, an image acquired by the image acquisition unit 120 is referred to as an 'acquired image'.

Various features such as lights on the ceiling, edges, corners, blobs, and ridges are included in the acquired image.

The map generation module 152 extracts features from acquired images and calculates a descriptor based on feature points. The descriptor means data in a predetermined format for showing feature points and means mathematical data in a format from which the distance or similarity between descriptors can be calculated. For example, the descriptor may be n-order vector (n is a natural number) or matrix type data.

The map generation module 152 can classify at least one descriptor into a plurality of groups for each acquired image in accordance with a predetermined lower-rank classification rule and can convert the descriptors included in the same group into lower-rank representative descriptors, respectively, in accordance with a predetermined low-rank representation rule, based on descriptor information obtained through acquired images of respective positions.

As another example, it may be possible to classify all descriptors collected from acquired images in a predetermined region such as a room into a plurality of groups in accordance with a predetermined lower-rank classification rule and to convert the descriptors included in the same group into lower-rank representative descriptors, respectively, in accordance with the predetermined low-rank representation rule.

The map generation module 152 can obtain feature distribution of each position through this process. The feature distribution of each position may be expressed as a histogram or an n-order vector. As another example, the map generation module 152 can estimate an unknown current position based on descriptors calculated from respective feature points without through the predetermined lower-rank classification rule and the predetermined lower-rank representation rule.

Further, when the current position of the moving robot 100 is in an unknown state due to a reason such as a position jump, it is possible to estimate the current position based on data such as pre-stored descriptors or lower-rank representative descriptors.

The moving robot 100 acquires an acquired image through the image acquisition unit 120 at an unknown current position. Various features such as lights on the ceiling, edges, corners, blobs, and ridges are found out through images.

The position recognition module 153 extracts features from an acquired image and calculate a descriptor.

The position recognition module 153 converts it into comparison target position information (e.g., feature distribution of each position) and comparable information (lower-rank recognition feature distribution) in accordance with a predetermined lower-rank conversion rule based on at least one descriptor obtained through an acquired image of an unknown current position.

In accordance with the predetermined lower-rank conversion rule, it is possible to calculate each similarity by comparing each position feature distribution with each recognition feature distribution. It is possible to calculate similarity (probability) for each of the positions corresponding to each position and to determine the position where the largest probability is calculated as a current position.

As described above, the controller 150 can divide a traveling section, and can generate a map composed of a plurality of regions or recognize the current position of the main body 110 based on a pre-stored map.

When a map is generated, the controller 150 can transmit the generated map to an external terminal, a server, etc. through the communication unit 190. Further, when a map is received from an external terminal, a server, etc., as described above, the controller 150 can store the map in the storage 105.

In this case, the map may having a cleaning region divided into a plurality of regions, include connection passages connecting the plurality of regions, and include information about obstacles in the regions.

When a cleaning instruction is input, the controller 150 determines whether a position on the map and the current position of the moving robot coincide. The cleaning instruction can be input from a remote controller, an input unit, or an external terminal.

When the current position does not coincide with a position on the map or when it is impossible to find out the current position, the controller 150 can recover the current position of the moving robot 100 by recognizing the current position and control the driving unit 160 to move to a designated region based on the current position.

When the current position does not coincide with a position on the map or when it is impossible to find out the current position, the position recognition module 153 can estimate the current position based on the map by analyzing acquired images input from the image acquisition unit 120. Further, the obstacle recognition module 154 or the map generation module 152 can also recognize the current position in the same way.

After the current position of the moving robot 100 is recovered by recognizing a position, the traveling control module 151 calculates a traveling path from the current position to the designated region and controls the driving unit 160 to move to the designated region.

When receiving cleaning pattern information from a server, the traveling control module 151 can divide the entire traveling section into a plurality of regions in accordance with the received cleaning pattern information and can set one or more regions as designated regions.

Further, the traveling control module 151 can calculate traveling paths in accordance with the received cleaning pattern information and the moving robot can perform cleaning while moving along the traveling paths.

When the designated region finishes being cleaned, the controller 150 can store a cleaning history in the storage 105.

Further, the controller 150 can transmit the operation state of the moving robot 100 or the cleaning state to an external terminal or a server at a predetermined period through the communication unit 190.

Accordingly, the external terminal displays the position of the moving robot together with a map in an image of an application that is being executed and outputs information about the cleaning state based on the received data.

The moving robot 100 according to an embodiment of the present disclosure can move in one direction until an obstacle or a wall is sensed, and when the obstacle recognition module 154 senses an obstacle, the moving robot 100 can determine traveling patterns such as straight forward movement and turning.

Meanwhile, the controller 150 can control the moving robot to perform an avoidance traveling in different patterns based on the properties of recognized obstacles. The controller 150 can control the moving robot to perform avoidance traveling in different patterns in accordance with the properties of obstacles such as a non-dangerous obstacle (a common obstacle), a dangerous obstacle, and a movable obstacle.

For example, the controller 150 can control the moving robot to avoid a dangerous obstacle by detouring the dangerous obstacle while securing a longer safety distance.

Further, when there is a movable obstacle and the movable obstacle does not move after a predetermined standby time, the controller 150 can control the moving robot to perform avoidance traveling that corresponds to a normal obstacle or avoidance traveling that corresponds to a dangerous obstacle. Alternatively, when an avoidance traveling pattern corresponding to a movable obstacle is separately set, the controller 150 can control the moving robot in accordance with the pattern.

The moving robot 100 according to an embodiment of the present disclosure can perform obstacle recognition and avoidance based on machine learning.

The controller 150 may include the obstacle recognition module 154 that recognizes pre-learned obstacles through machine learning from an input image, and the traveling control module 151 that controls driving of the driving unit 160 based on the recognized obstacles.

On the other hand, an example in which a plurality of modules 151, 152, 153, and 154 are separately provided in the controller 150 is shown in FIG. 4, but the present disclosure is not limited thereto.

For example, the position recognition module 153 and the obstacle recognition module 154 may be integrated into one recognizer, whereby they may be configured as one recognition module 155. In this case, it is possible to train the recognizer using a learning technique such as machine learning, and the trained recognizer can recognize the properties of regions, things, etc. by classifying data that are input later.

Depending on embodiments, the map generation module 152, the position recognition module 153, and the obstacle recognition module 154 may be configured in one integrated module.

Hereafter, an embodiment in which the position recognition module 153 and the obstacle recognition module 154 are configured as one recognition module 155 by being integrated into one recognizer is mainly described, but even if the position recognition module 153 and the obstacle recognition module 154 are separately provided, they can be operated in the same way.

The moving robot 150 according to an embodiment of the present disclosure may include a recognition module 155 that has learned the properties of things and spaces through machine learning.

Machine learning means making a computer perform learning through data and solve problems by itself even if a person does directly give a logic to the computer.

Deep learning is an artificial intelligence technology that enables a computer to perform learning by itself like human even if a person does not teach the computer in the way of teaching human based on an artificial neural network (ANN) for configuring artificial intelligence.

The artificial neural network (ANN) may be implemented in a software type or a hardware type such as a chip.

The recognition module 155 may include an artificial neural network (ANN) of a software or hardware type trained with the properties of spaces and the properties of things such as obstacles.

For example, the recognition module 155 may include a DNN (Deep Neural Network) such as a CNN (Convolutional Neural Network), an RNN (Recurrent Neural Network), a DBN (Deep Belief Network) trained through deep learning.

The recognition module 155 can determine the properties of spaces and things included in input image data based on weights between nodes included in the DNN.

On the other hand, the traveling control module 151 can control driving of the driving unit 160 based on the properties of the recognized spaces and obstacles.

Meanwhile, the recognition module 155 can recognize the properties of spaces and obstacles included in selected specific time point image based on data learned in advance through machine learning.

Meanwhile, input data for determining the properties of spaces and things and data for training the DNN may be stored in the storage 105.

Original images acquired by the image acquisition unit 120 and extracted images with predetermined regions extracted may be stored in the storage 105.

Further, depending on embodiments, weights and biases constituting the DNN structure may be stored in the storage 105.

Alternatively, depending on embodiments, the weights and biases constituting the DNN structure may be stored in an embedded memory of the recognition module 155.

Meanwhile, the recognition module 155 may perform a learning process using predetermined images as training data every time the image acquisition unit 120 acquires an image or extracts a portion of an image, or may perform a learning process after a predetermined number of or more images are acquired.

Alternatively, the moving robot 100 can receive data related to machine learning from the predetermined server through the communication unit 190.

In this case, the moving robot 100 can update the recognition module 155 based on the data related to machine learning and received from the predetermined server.

Figure 5:
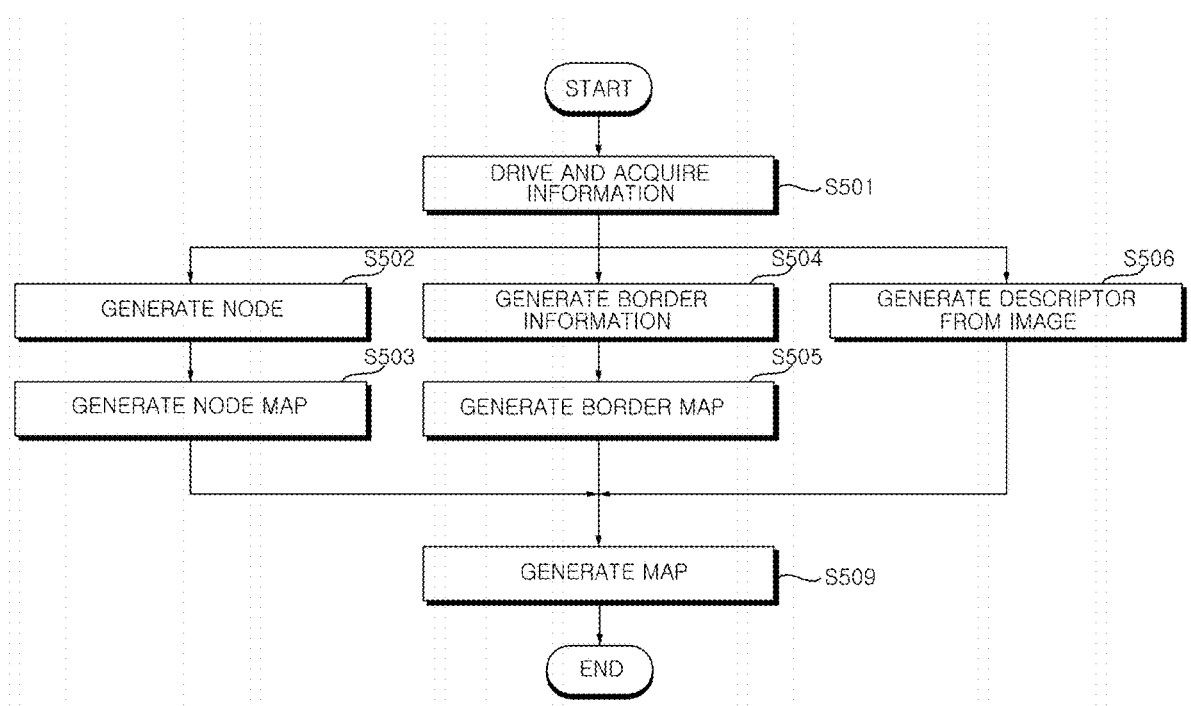
FIG. 5 is a flowchart showing a method of controlling a moving robot according to an embodiment of the present disclosure.

FIG. 5 is a flowchart showing a method of controlling a moving robot according to an embodiment of the present disclosure, that is, a flowchart showing a map generation process and FIGS. 6 to 9 are views that are referred to for description of the control method of FIG. 5.

Figure 6:
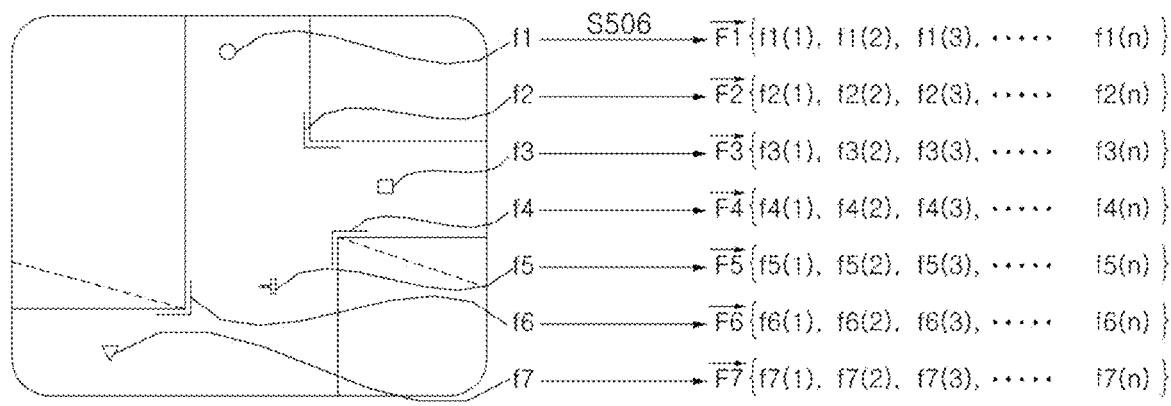
FIGS. 6 to 9 are views that are referred to for description of the control method of FIG. 5.
Figure 7:
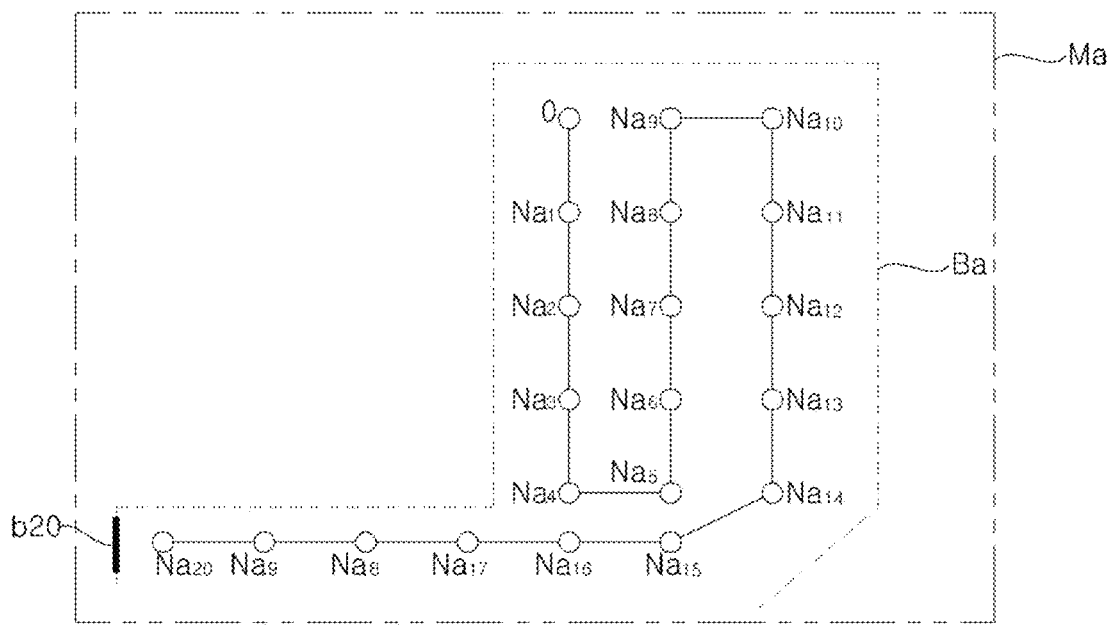

FIGS. 6 and 7 are conceptual views exemplifying a traveling and information acquisition process S501, a node generation process S502, a node map generation process S503, a border information generation process S504, a border map generation process S505, and a descriptor generation processor S506 of FIG. 5.

In FIG. 6, an image acquired in the process S501 and a plurality of feature points f1, f2, f3, f4, f5, f6, and f7 in the image are shown and diagrams that generate descriptors $\vec{F1}$, $\vec{F2}$, $\vec{F3}$, ..., $\vec{F7}$ that are n-order vectors respectively corresponding to the plurality of feature points f1, f2, f3, f4, f5, f6, and f7 in the process S506 are shown.

Referring to FIGS. 6 and 7, in the information acquisition process S501, the image acquisition unit 120 acquires an image at each point while the moving robot 100 travels. For example, the image acquisition unit 120 can acquire an image of a ceiling by photographing upward from the moving robot 100.

Further, in the information acquisition process S501, it is possible to sense traveling obstruction factors using the sensor unit 170, the image acquisition unit 120, and other well-known devices while the moving robot 100 travels.

The moving robot 100 can sense traveling obstruction factors at each point. For example, the moving robot can sense the outer surface of a wall that is one of traveling obstruction factors at a specific point.

Referring to FIGS. 6 and 7, in the node generation process S502, the moving robot 100 generates a node corresponding to each point. Coordinate information corresponding to nodes Na18, Na19, and Na20 may be generated based on a traveling constraint measured by the moving robot 100.

The traveling constraint is a concept that includes a movement direction and a movement distance of the moving robot. Assuming that the floor of a traveling section is in a plane in which an X-axis and a Y-axis cross at right angles, the traveling constraint may be expressed as $(\Delta x, \Delta y, \theta)$. $\Delta x, \Delta y_{\Delta x, \Delta y}$ mean constraints in the X-axial and Y-axial directions, respectively, and $\theta$ means a rotational angle.

The controller 150 can measure a traveling constraint of the moving robot 100 based on the operation of the driving unit 160. For example, the traveling control module 151 can measure the current or past movement speed, the traveling distance, etc. of the moving robot 100 based on the rotational speed of the wheel unit 111, and can also measure the current or pass turning process in accordance with the rotational direction of the wheel unit 111.

Further, the controller 150 may measure the traveling constraint using data sensed by the sensing unit 170.

Referring to FIGS. 6 and 7, in the border information generation process S504, the moving robot 100 generates border information b20 corresponding to a traveling obstruction factor. In the border information generation process S504, the moving robot 100 generates border information corresponding to each traveling obstruction factor. A plurality of items of border information corresponds to a plurality of traveling obstruction factors, respectively. The border information b20 can be generated based on the coordinate information of a corresponding node and a distance value measured by the sensor unit 170.

Referring to FIGS. 6 and 7, the node map generation process S503 and the border map generation process S505 are simultaneously performed. In the node map generation process S503, a node map including a plurality of nodes Na18, Na19, Na20, etc. is generated. In the border map generation process S505, a border map Ba including a plurality of items of information b20, etc. is generated. In the node map generation process S503 and the border map generation process S505, a map Ma including a node map and the warning mp Ba is generated. FIG. 6 shows a map Ma that is being generated through the node map generation process S503 and the border map generation process S505.

In the image shown in FIG. 6, various feature points by lights on the ceiling, edges, corners, blobs, ridges, etc. are found out. The moving robot 100 extracts feature points from an image. Various feature detections that extract feature points from an image have well known in the field of computer vision technology. Various feature detectors suitable for extracting the feature points have been well known. For example, there are Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, and Grey-level blobs detectors.

Referring to FIG. 6, in the descriptor generation processor S506, descriptors $\vec{F1}, \vec{F2}, \vec{F3}, \ldots, \vec{F7}$ are generated based on a plurality of feature points f1, f2, f3, ..., f7 extracted from an acquired image. In the descriptor generation processor S506, descriptors $\vec{F1}, \vec{F2}, \vec{F3}, \ldots, \vec{Fm}$ are generated based on a plurality of feature points f1, f2, f3, ..., fm extracted from a plurality of acquired images (where m is a natural number). A plurality of descriptors $\vec{F1}, \vec{F2}, \vec{F3}, \ldots, \vec{Fm}$ respectively corresponds to a plurality of feature points f1, f2, f3, ..., fm.

$\vec{F1}, \vec{F2}, \vec{F3}, \ldots, \vec{Fm} \vec{F1}, \vec{F2}, \vec{F3}, \ldots, \vec{Fm}$ are n-order vectors. $\vec{F1}$ f1(1), f1(2), f1(3), ..., f1(n) in the brace { } of $\vec{F1}$ are values of respective orders of $\vec{F1}$. The others $\vec{F2}, \vec{F3}, \ldots, \vec{F7}$ are expressed in the same way, so they are not described.

A plurality of descriptors $\vec{F1}, \vec{F2}, \vec{F3}, \ldots, \vec{Fm}$ corresponding to the plurality of feature points f1, f2, f3, ..., fm can be generated using SIFT (Scale Invariant Feature Transform) in order to detect feature points.

For example, by applying SIFT, it is possible to select feature points f1, f2, f3, f4, f5, f6, and f7 that are easily recognized from an image and then generate descriptors that are n-order vectors based on a distribution characteristic of the brightness gradient of pixels pertaining to a predetermined region around the feature points f1, f2, f3, f4, f5, f6, and f7 (the direction of a brightness change and the degree of steepness of the change). In this case, it is possible to generate an n-order vector (descriptor) in which the direction of each brightness change of a feature point is each order and the degree of steepness of the change for the direction of each brightness change is a value for each order. SIFT can detect features that are not changed against a scale, rotation, and a brightness change of a photographing target, so it is possible to detect invariant (i.e., rotation-invariant) features even if photographing the same region while changing the posture of the moving robot 100. Obviously, the present disclosure is not limited thereto and other various techniques (e.g., HOG: Histogram of Oriented Gradient, Haar feature, Fems, LBP: Local Binary Pattern, and MCT: Modified Census Transform) may be applied.

Figure 8:
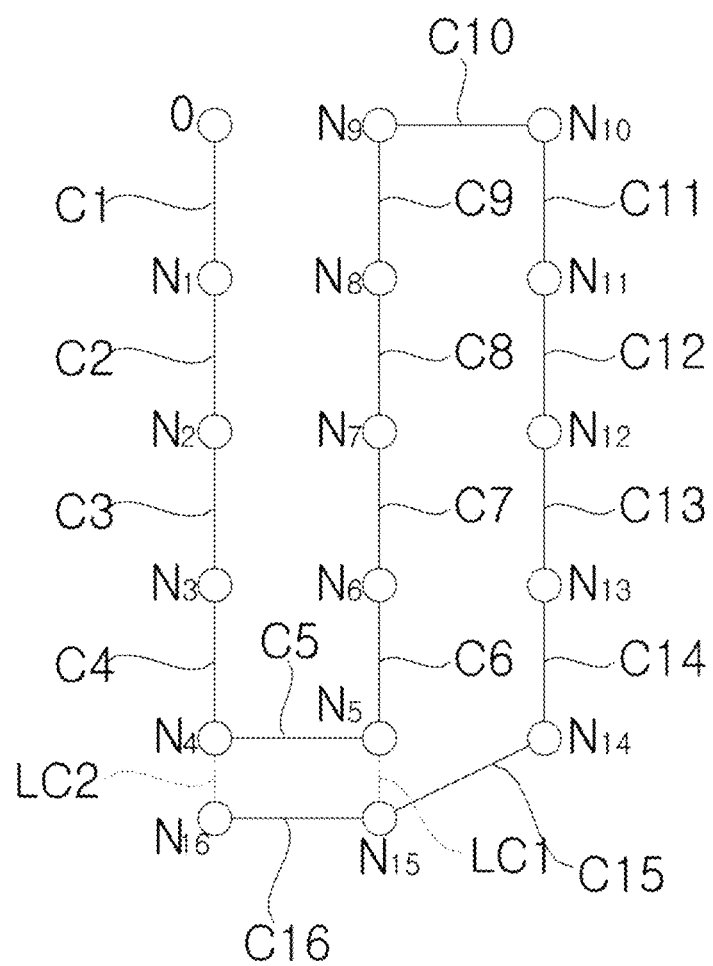

FIG. 8 is a conceptual view showing a plurality of nodes N that the moving robot generates while moving, and constraints C between the nodes.

Referring to FIG. 8, a traveling constraint C1 is measured and information of a node N1 is generated with an origin node O set. Thereafter, it is possible to generate coordinate information of a node N2 that is an end point of a traveling constraint C2 by adding the traveling constraint C2 to the coordinate information of the node N1 that is a start point of the traveling constraint C2. With the information of the node N2 generated, a traveling constraint C3 is measured, whereby information of a node N3 is generated. As described above, information of nodes N1, N2, N3, . . . , N16 is sequentially generated based on traveling constraints C1, C2, C3, . . . , C16 that are sequentially measured.

When a node C15 that is the start point of any one traveling constraint C15 is defined as a 'fundamental node' of a node 16 that is the end point of the traveling constraint 15, a loop constraint LC is a value obtained by measuring the constraint between any one node N15 and another adjacent node N5 that is not the 'fundamental node N14' of the any one node 15.

For example, acquired image information corresponding to any one node N15 and acquired image information corresponding to another adjacent node N5 are compared, whereby a loop constraint LC between the two nodes N15 and n5 can be measured. As another example, distance information from the surrounding environment of any one node N15 and distance information from the surrounding environment of another adjacent node N5 are compared, whereby a loop constraint LC between the two nodes N15 and n5 can be measured. FIG. 8 exemplifies a loop constraint LC1 measured between a node N5 and a node N15 and a loop constraint LC2 measured between a node 4 and a node 16.

The information of any one node N5 generated based on the traveling constraint may include node coordinate information and image information corresponding to the node. When there is another node N15 that is adjacent to the node N5, the loop constraint LC1 between the two nodes N5 and N15 is measured by comparing image information corresponding to the node N15 and image information corresponding to the node N5. When the 'loop constraint LC1' and 'a constraint calculated in accordance with pre-stored coordinate information of the two nodes N5 and N15' are different from each other, it is considered that there is an error in the node coordinate information, whereby it is possible to update the coordinate information of the two nodes N5 and n15. In this case, the coordinate information of other nodes N6, N7, N8, N9, N10, N11, N12, N13, and N14 connected with the two nodes N5 and N15 can also be updated. Further, even node coordinate information that has been updated once can be repeatedly updated through the process described above.

More detailed description is as follows. Two nodes N of which the loop constraints LC are measured are defined as a first loop node and a second loop node, respectively. There may be a difference $(\Delta x1-\Delta x2, \Delta y1-\Delta y2, \theta1-\theta2)$ (between a 'calculated constraint $(\Delta x1, \Delta y1, \theta1)$' (calculated by a difference of coordinate values) calculated by the pre-stored node coordinate information of the first loop node and node coordinate information of the second loop node, and the loop constraint LC $(\Delta x2, \Delta y2, \theta2)$. When this difference is generated, it is possible to update the node coordinate information by considering the difference as an error. Further, the node coordinate information is updated under the assumption that the loop constraint LC is a more accurate value than the calculated constraint.

When node coordinate information is updated, it may be possible to update only the node coordinate information of the first loop node and the second loop node. However, since the error is generated by accumulation of errors of traveling constraints, it may be possible to update the node coordinate information of other nodes by distributing the error. For example, it is possible to update node coordinate information by distributing the error to all nodes generated by the traveling constraint between the first loop node and the second loop node. Referring to FIG. 8, when a loop constraint LC1 is measured and the error is calculated, all of the items of information of nodes N5 to N15 can be slightly updated by distributing the error to the nodes (N6 to N14) between the first loop node N15 and the second loop node N5. Obviously, it may also possible to update the node coordinate information of other nodes N1 to N4 too by enlarging the error distribution.

Figure 9:
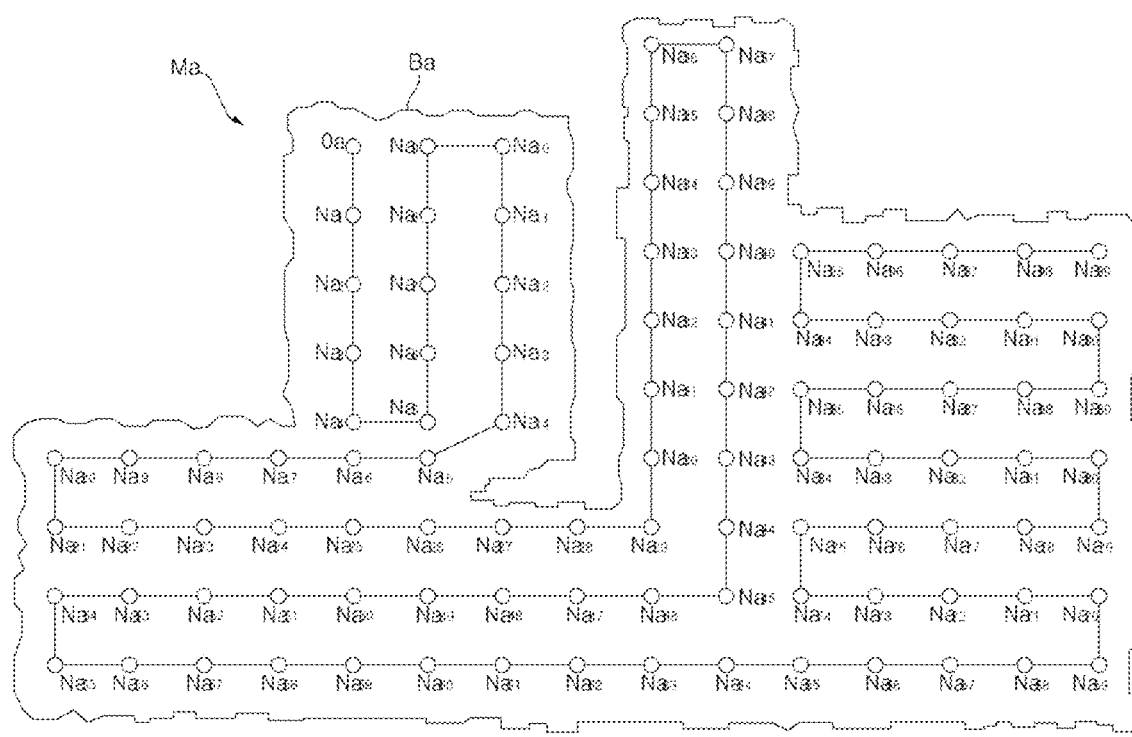

FIG. 9 is a conceptual view showing an example of a first map Ma, which includes generated nodes. In FIG. 9, an example of any one map generated through the map generation process according to FIG. 5 is shown. The map Ma includes a node map and a border map Ba. The node map includes a plurality of first nodes Na1 to Na99.

Referring to FIG. 9, any one map Ma may include node maps Na1, Na2, . . . , Na99 and a border map Ba. The node map is information composed of a plurality of nodes of various items of information on one map and the border map is information composed of a plurality of items of border information of various items of information on one map. The node map and the border map are components of the map, and the generation processes S502 and S503 of the node map and the generation processes S504 and S505 simultaneously proceed. For example, the distance from a traveling obstruction factor spaced apart from a specific point is measured, and then border information may be generated based on the coordinate information of a pre-stored node corresponding to the specific point. For example, the node coordinate information of a node may be generated based on pre-stored border information corresponding to a specific obstruction factor after the distance from a specific point spaced apart from the specific obstruction factor. As for a node and border information, based on the relative coordinates of another one to any one, the another one may be generated on a map.

Further, the map may include image information generated in the process S506. A plurality of items of information corresponds to a plurality of nodes, respectively. Specific image information corresponds to a specific node.

As described above, generation and update of a map and position recognition are performed based on nodes and node information. Accordingly, in order to improve accuracy of a map and performance, it is required to optimize node registration conditions that are set when newly generating a node or adding a node to an existing map.

Figure 10:
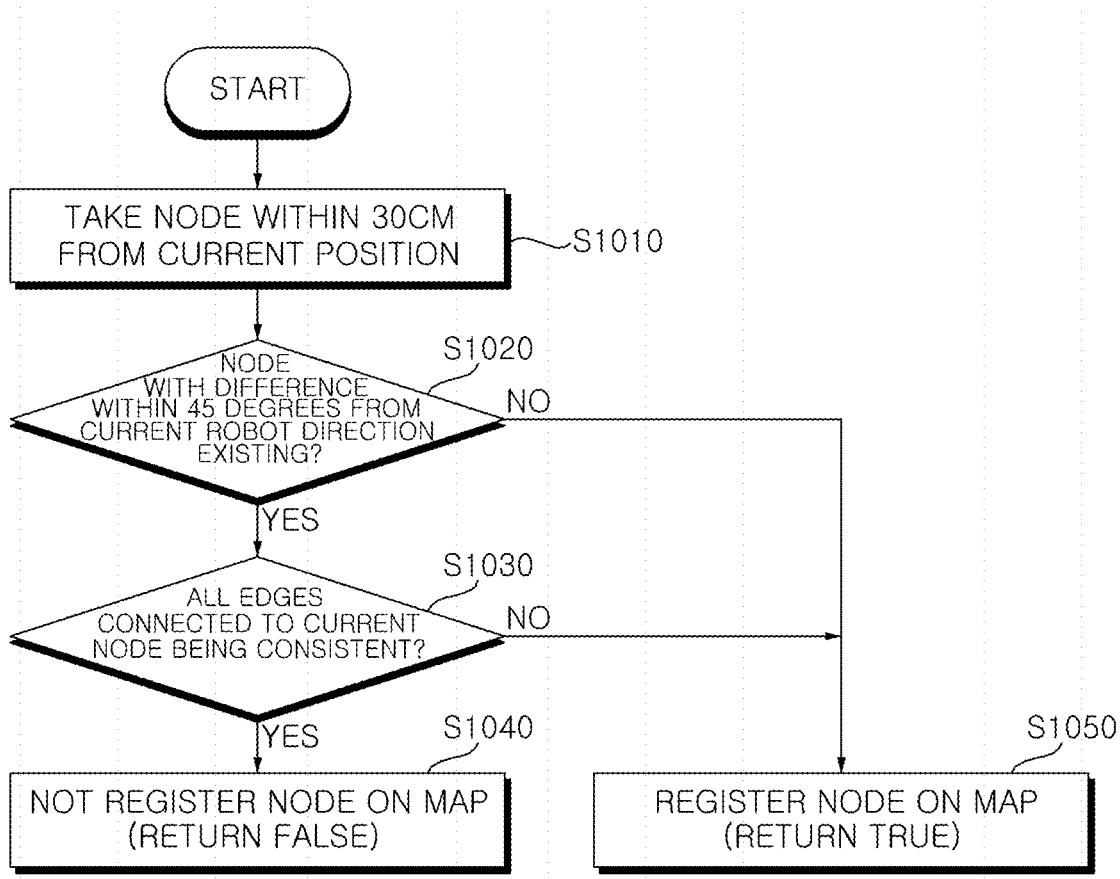
FIG. 10 is a view that is referred to for description of node registration conditions.

FIG. 10 is a view that is referred to for description about node registration conditions and shows an example in detail a process of checking whether to register a node no a map.

Referring to FIG. 10, the controller 150 can gather nodes within 30 cm from the current position of the moving robot 100 on a node map (S1010).

The controller 150 can generate a node at a specific point in accordance with the node generation process S502. Further, the controller 150 can generate a node based on the current position of the moving robot 100.

Further, the controller 150 can gather nodes within 30 cm from a node corresponding to the current position of the moving robot 100 (S1010).

Thereafter, the controller 150 can check whether there is a node with a difference within 45 degrees from the current traveling direction of the robot in the gathered nodes (S1020).

The controller 150 can determine a node with a difference within 45 degrees from the current robot direction θ by comparing the angle (pose) when generating the gathered nodes with the current angle (pose).

When there is no node with a difference within 45 degrees from the current robot direction in the gathered nodes, the controller 150 can register a node corresponding to the current position on the map (S1050).

If there is a node with a difference within 45 degrees from the current robot direction in the gathered nodes, the controller 150 determines whether all edges connected to the node corresponding to the current position are consistent (S1030).

When determining that all edges connected to the node corresponding to the current position are consistent by checking the node information of the existing map, the controller 150 can end the process of checking whether to register a node on the map without registering the node on the map (S1040).

If determining that all edges connected to the node corresponding to the current position are not consistent by checking the node information of the existing map, it is possible to end the process of registering the node on the map and checking whether to register a node at a specific point on the map (S1040).

A directional difference, which is a factor related to the view point of the moving robot 100, can be used as a node registration reference.

Accordingly, whether the differences between the nodes gathered with a predetermined distance from the current position and the current robot direction is a predetermined level or more was used as the most important node registration reference in the embodiment described with reference to FIG. 10.

In this case, even if some nodes are changed in a node map such as a slam map, if there is an existing node within a predetermined angle, the node is not registered. That is, a node is not registered even if illumination, light, the position of an object, etc. are slightly changed. If when position recognition fails, a reset operation that makes a map by generating all nodes again, etc. may be performed.

That is, a map is almost determined through one-time traveling, and thereafter, the map is only reset in limited situations such as when position recognition fails. Accordingly, it is impossible to adopt to an environment in which illumination, light, the position of an object, etc. are slightly changed, by using one fixed map.

Further, even though a plurality of maps is generated and one map is selected and used, depending on situations, it is impossible to cope with some changes in the environment of a traveling section.

For efficient learning cleaning, there is a need for a process of accurately finding out the current position of the map on a map stored before.

However, due to an environmental change between the point in time of storing the map before and the current point in time, it is difficult to find out the current position of the robot, so performance of learning cleaning may be deteriorated.

Further, the kinds of environments in which performance is deteriorated depend on the sensors that are used in the robot. For example, a camera is largely influenced by changes in illumination and light and LiDAR is largely influenced by changes in position and shape of an object.

Since the kinds of these environmental changes are very various, it is almost impossible to selectively learn specific environments.

Accordingly, there is a need for a process of using existing map information for the same parts and updating the existing map through additional learning for different parts, by comparing the map that the robot had before and the current environment regardless of the kinds of environmental changes.

The present disclosure can generate a map that is strong against environmental changes by performing additional learning for parts different from an existing map in accordance with various environmental changes that occur ever time cleaning is performed.

Further, it is possible to perform efficiency learning cleaning by additionally updating map information about various environments at the point in time of cleaning every time cleaning is finished.

Further, the accumulated data corresponding to environmental changes are increased through repeated learning and it is possible to expect improvement of performance in the next learning cleaning.

Hereafter, a method of generating and updating a node registration reference and a map according to the present disclosure is described with reference to drawings.

Figure 11:
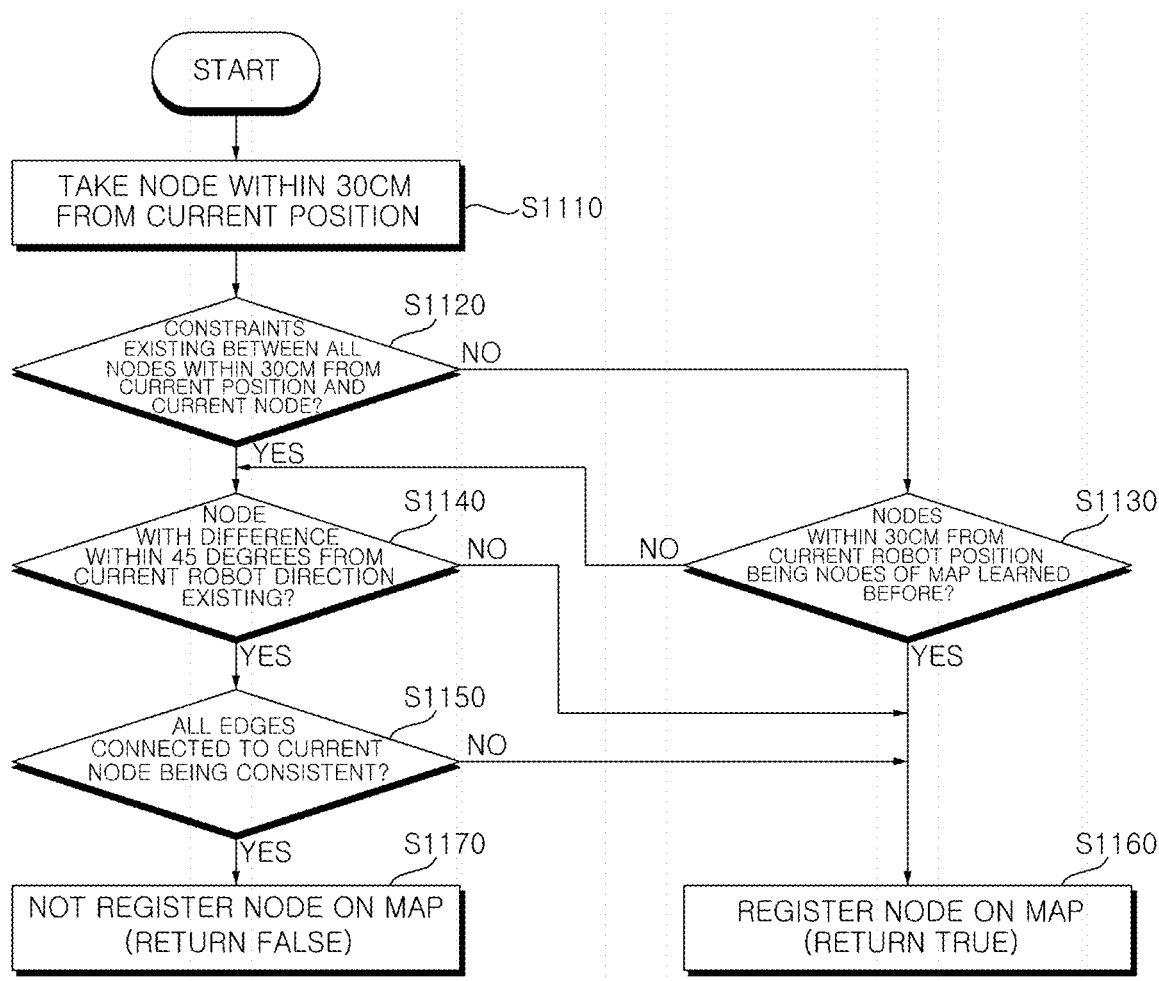
FIG. 11 is a flowchart showing a method of controlling a moving robot according to an embodiment of the present disclosure.

FIG. 11 is a flowchart showing a method of controlling a moving robot according to an embodiment of the present disclosure, which shows in detail an example of a process of checking whether to register a mode on a map.

Referring to FIG. 11, the moving robot 100 can check nodes within a predetermined reference distance from a node corresponding to a current position (S1110). For example, the controller 150 can check nodes within 30 cm from the current position of the moving robot 100 on a node map and can gather nodes existing within the distance (S1110).

Meanwhile, the controller 150 can check nodes within a predetermined reference distance from a node corresponding to a current position on a node map (S1110). In this case, the node map, which is a map including a plurality of nodes showing the position of the robot calculated using sensing information, may be a SLAM map.

When the reference distance is set as 30 cm, the controller 150 can check nodes within 30 cm from the current position and can set all nodes existing at around 30 cm from the current position of the robot as candidate nodes. It is a waste to register unnecessary nodes in terms of resource management, so it may be possible to check neighborhood nodes existing within a reference distance and register nodes only when there is a need for additional information on a map in order to determine whether to register a node.

Meanwhile, the controller 150 can determine whether there is a correlation between a node within the reference distance and the node corresponding to the current position (S1120).

For example, the controller 150 can determine whether an edge (constraint) exists between all nodes within 30 cm from the current position and the current node. This may be checking whether there is no feature matching of the current node with nodes within 30 cm. For example, when there is a corner point as a feature point, it is possible to determine whether a correlation exists by comparing the corner position with a previous corner position and then determining whether there are relative coordinates of the robot.

Meanwhile, an edge that connects nodes in a slam based on a graph is traveling constraint information between positions of the robot and may be referred to as a constraint.

That is, an edge (constraint) may show the relationship between nodes as relative coordinates of a node and the robot. That is, when an edge (constraint) exists, it may mean that there is sensing information partially overlapping each other between nodes.

The controller 150 can check whether an edge (constraint) exists by comparing candidate nodes within 30 cm from the current node corresponding to the current position of the robot with the current node.

If an edge exists, it may mean that there is a feature commonly shown between a node within 30 cm and the current node and there is even feature matching between the nodes.

When a correlation does not exist (S1120), the controller 150 can determine whether it is a new region and there was only an environmental change in the same region as an existing region.

When a correlation does not exist (S1120), the controller 150 can determine whether a node within the reference distance is a node in a previously learned map (S1130).

For example, when a node within the reference distance is learned n times (n>=2), the controller 150 can check whether the node is a node existing on a map accumulated and generated until previous (n−1-th) learning.

If a node within the reference distance which has a correlation with a node corresponding to the current position in the n-th learning traveling is determined as a node on an n−1-th learning map in which previous (n−1-th) learning has been reflected, it is a node that is not feature-matched until the n−1-th learning, so it is required to register the node.

Accordingly, when a node within the reference distance is determined as a node in the previous learned map, the controller 150 can register the current node on the map (S1160).

That is, when a node within the reference distance is determined as a node in the previous learned map, the controller 150 can register the current node on the map by determining that there were environmental changes in the existing environment such as light, illumination, and the position of an object (S1160).

Accordingly, it is possible to generate a map in which the environment of a traveling section and environmental changes are appropriately reflected.

In this case, in order to secure alignment with the existing map, it is possible to add a node corresponding to the current position through comparison with nodes in the existing map.

In the related art, even if some nodes in a slam map are changed, nodes are not registered if there are existing nodes. That is, a node is not registered even if illumination, light, the position of an object, etc. are slightly changed.

However, according to the present disclosure, when there is a correlation between the current node and another neighborhood node and the neighborhood node is an existing node, it is considered as being due to an environmental change and the current node is additionally registered. Accordingly, it is possible to adapt to environments that are slightly changed.

Depending on embodiments, the existing node information can be changed by additional registration of the current node. For example, node coordinate information, etc. of surrounding nodes having a correlation with the current node may be updated to minimize errors. Further, it is possible to update and optimize node information such that the sum of errors between the current node and nodes existing within a predetermined distance or all nodes on a map becomes minimum.

Meanwhile, when the correlation exists (S1120), the controller 150 can determine whether there is a node having a difference of a reference angle or less from the current robot direction in nodes within the reference distance (S1140).

Further, when nodes within the reference distance are not determined as nodes on a previously learned node (S1130), the controller 150 can determine whether there is a node having a difference of a reference angle or less from the current robot direction in the nodes in the reference distance (S1140).

That is, when a correlation exists (S1120) or when nodes within the reference distance are not determined as nodes on the previously learned map (S1130), the controller 150 considers that the moving robot has entered a new region and can perform a process of determining whether to register a node as a reference according to the new region.

Meanwhile, the controller 150 can determine whether there is a node having a difference of a reference angle or less from the current traveling direction of the robot in nodes within the reference distance (S1140). For example, the controller 150 can determine whether there is a difference within 45 degrees from the current traveling direction of the robot. The reference angle may be set as 45 degrees from the traveling direction. Depending on embodiments, the reference direction may be set as 90 degrees of left and right 45 degrees from the traveling direction.

When there is no node having a difference of the reference angel or less from the current robot direction (S1140), it is possible to generate a map in which a meaningful environment change is reflected by registering the node on the map (S1160).

The controller 150 can determine a node with a difference within 45 degrees from the current robot direction θ by comparing the angle (pose) when generating gathered nodes with the current angle (pose) (S1140).

When there is no node with a difference within 45 degrees from the current robot direction in the gathered nodes, the controller 150 can register a node corresponding to the current position on the map (S1160).

If there is a node with a difference within 45 degrees from the current robot direction in the gathered nodes, the controller 150 determines whether all edges connected to the node corresponding to the current position are consistent (S1150).

That is, the reference angle such as 45 degrees is related to the view point of the robot, and if the view point is the same as an existing node within the reference angle, it is not needed to register the current node. Further, if it is a view point having a difference larger than the reference angle, it is possible to determine whether to register a node in accordance with whether edges are consistent.

When there is a node having a difference of the reference angle or less from the current direction of the robot (S1140), the controller 150 can determine whether the correlation of a node corresponding to the current position is consistent (S1150).

When determining that all edges connected to the node corresponding to the current position are consistent by checking the node information of n existing learning map, the controller 150 can end the process of checking whether to register a node on the map without registering the node on the map (S1170).

When the correlations of a node corresponding to the current position and a node having a difference of the reference angle or less from the current direction of the robot are consistent, the controller 150 can prevent map update due to a small environmental change by not registering the node corresponding to the current position on the map.

When the correlations of a node corresponding to the current position and a node having a difference of the reference angle or less from the current direction of the robot are not consistent (S1150), the controller 150 can register the node corresponding to the current position on the map (S1160).

That is, when determining that all edges connected to the node corresponding to the current position are not consistent by checking the node information of the existing map, it is possible to end the process of registering the node on the map and checking whether to register a node at a specific point on the map (S1160).

Even if registering the node of the current position in terms of optimization of the entire slam map, it is possible to register the node only when it is helpful (not consistency) in terms of optimization.

According to an embodiment of the present disclosure, it is possible to update a map in accordance with the method disclosed in FIG. 11 while repeatedly traveling through a predetermined traveling section and learning the traveling section. Accordingly, a map generated in N-th learning traveling may be referred to as an N-th learning map.

The moving robot 100 that performs cleaning, for example, can perform a first learning map after finishing the initial first cleaning. In the next second cleaning, the moving robot 100 can perform learning cleaning by loading the existing first learning map.

The controller 150, in the second traveling, can compare information received from the sensor unit 170 and the image acquisition unit 120 and information in the existing first learning map.

When they are the same, as the result of comparison, the controller 150 can perform only current position estimation based on the first learning map while keeping the existing first learning map.

When they are different, as the result of comparison, the controller 150 can additionally update the current information on the existing first learning map.

FIGS. 12 to 17 are flowcharts showing a method of controlling a moving robot according to an embodiment of the present disclosure.

Figure 12:
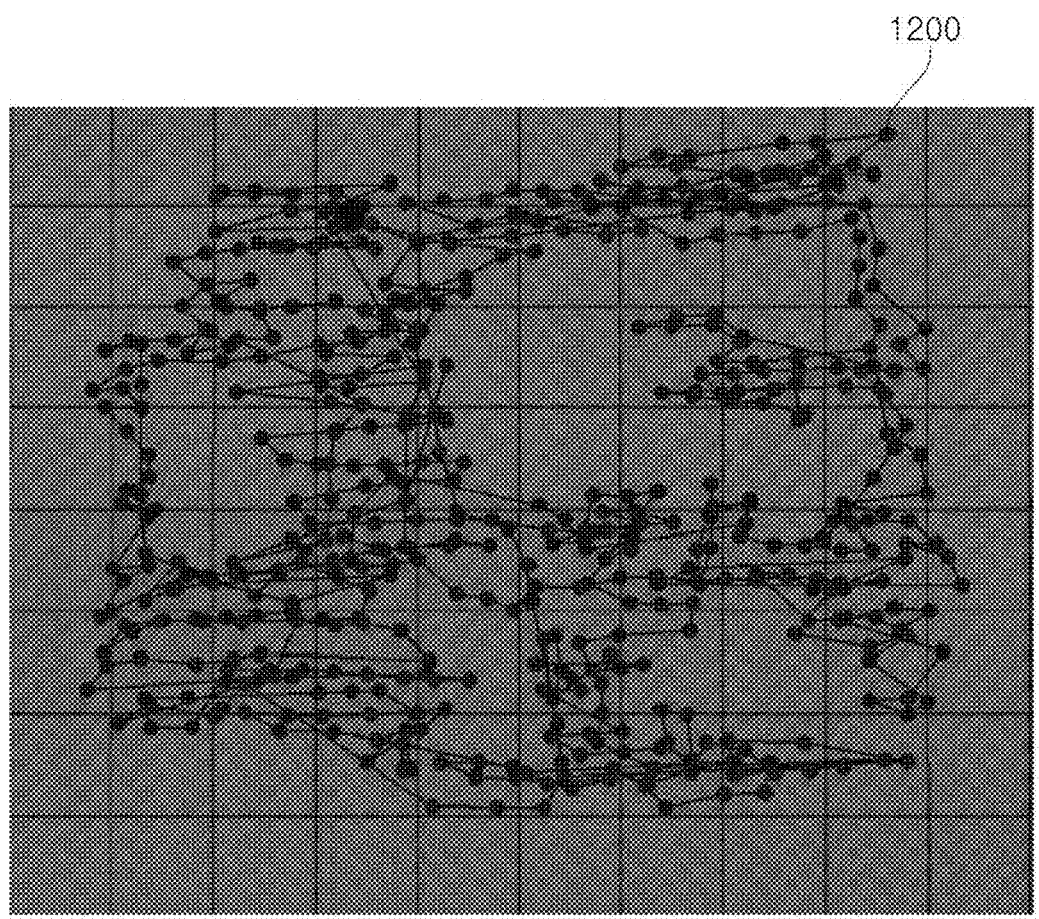
FIGS. 12 to 17 are flowcharts showing a method of controlling a moving robot according to an embodiment of the present disclosure.
Figure 13:
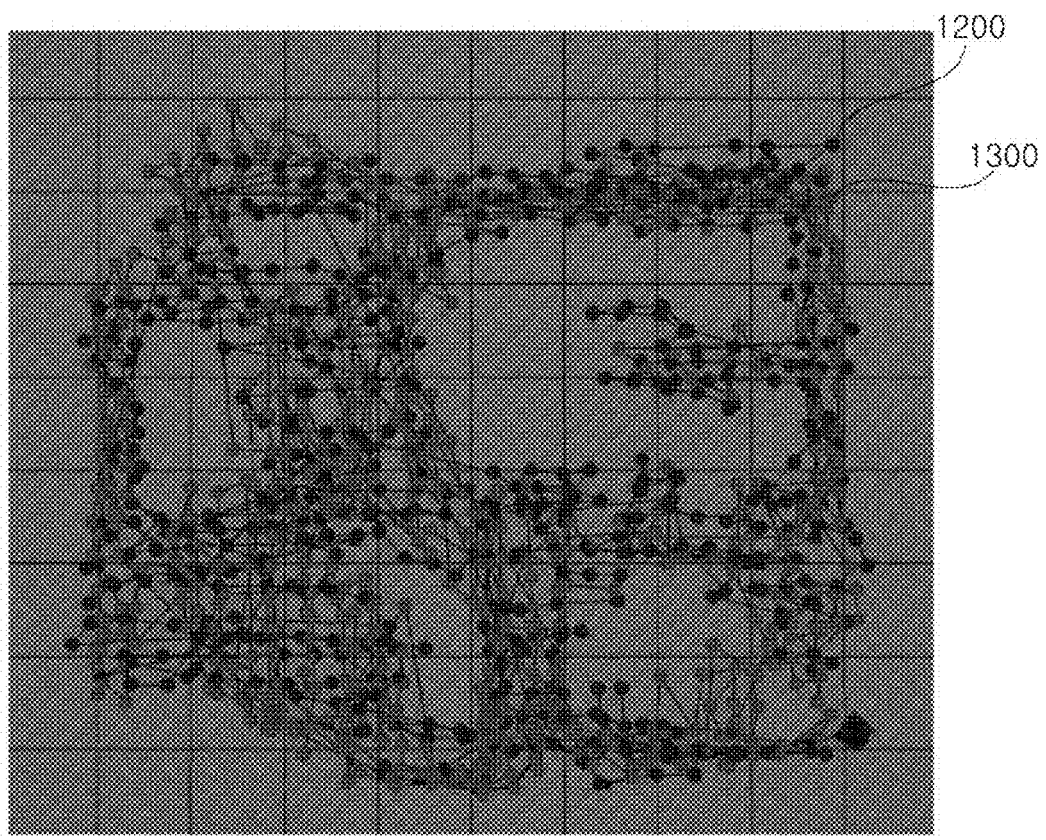

FIG. 12 exemplifies a node 1200 generated in first learning in a specific traveling section and FIG. 13 exemplifies a node 1200 generated in first learning in the same traveling section and a node 1300 added in second learning.

Such repeated learning may be performed with environments such as light, illumination, and the position of an object changed.

FIGS. 14 to 17 exemplify learning traveling environments at different time periods in the same traveling section.

Figure 14:
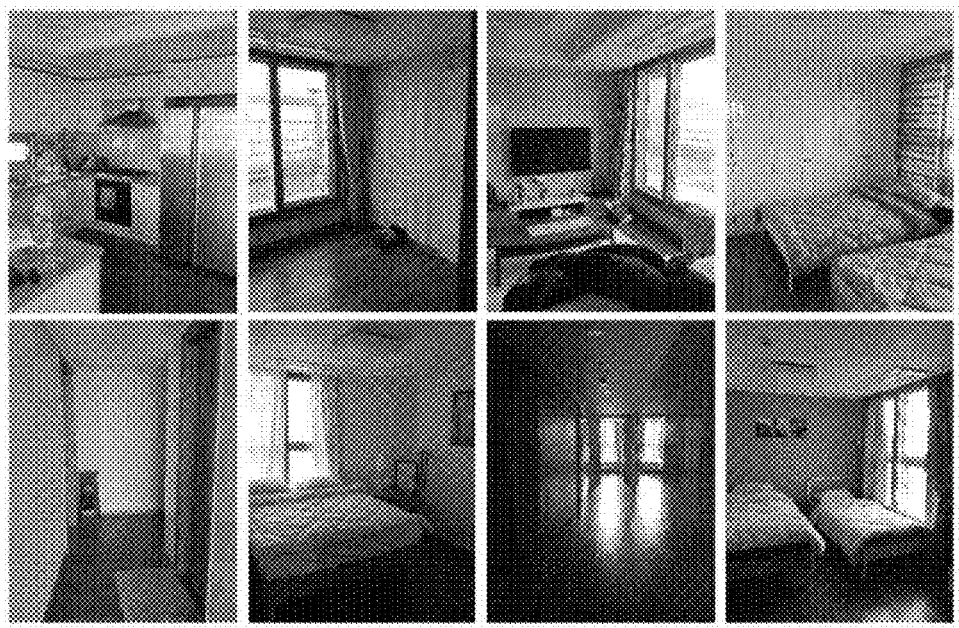
Figure 15:
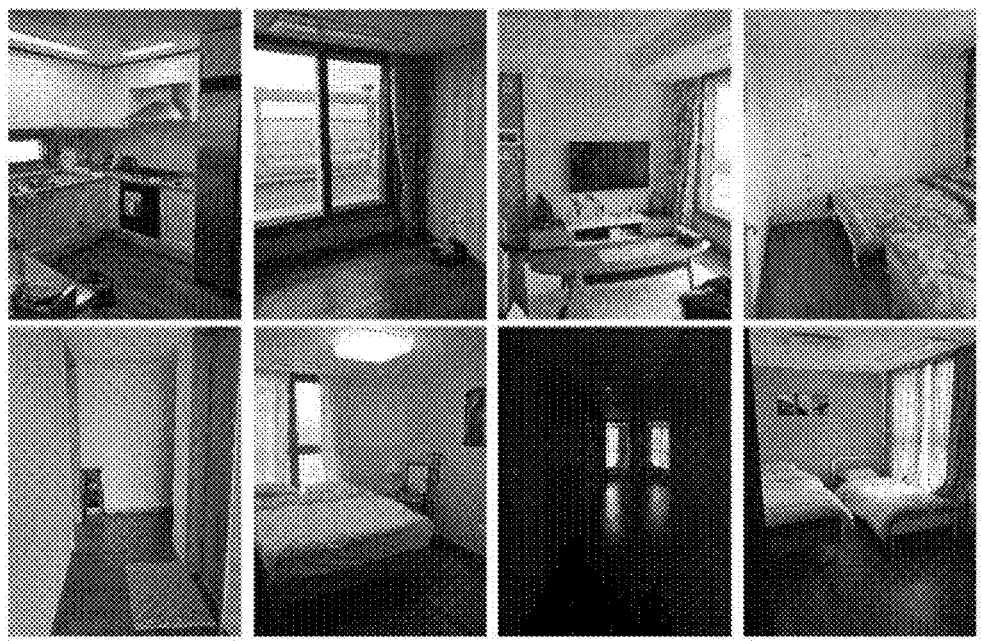
Figure 16:
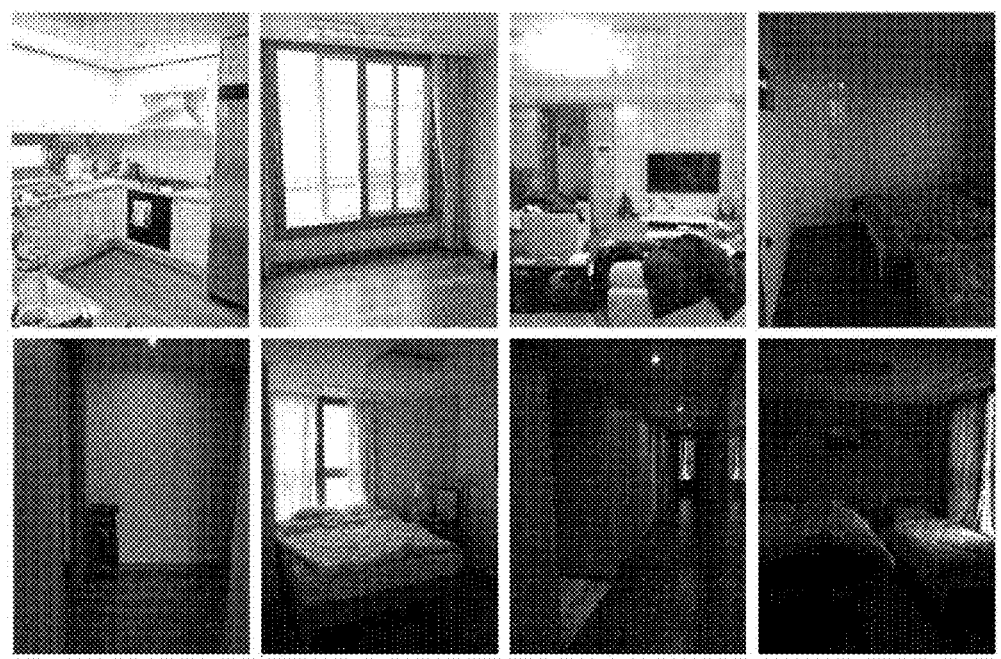
Figure 17:

FIG. 14 exemplifies a first time period environment (10:05~12:00), FIG. 15 exemplifies a second time period environment (13:20~15:30), FIG. 16 exemplifies a third time period environment (16:00~18:00), and FIG. 17 exemplifies a fourth time period environment (19:13~21:00).

As described above, it is possible to perform repeated learning in a state in which extracted feature points are different even in the same space by making a time period and a light condition different.

According to the present disclosure, it is possible to increase the quality of a learning map and optimize the learning map while repeatedly performing learning cleaning up to N times. Further, it is possible to generate a map that is strong against environmental changes by continuously gradually reflecting environmental changes in the same traveling section by repeatedly performing learning map update for the same traveling section.

Further, according to an embodiment of the present disclosure, if there is no change over a predetermined number of nodes when cleaning is finished with sufficient learning, it is possible to no more update a learning map such that map update is not infinitely repeated.

According to an embodiment of the present disclosure, it is possible to generate an available learning map even if there are environmental changes such as changes in light, illumination, weather, and the position of an object in the same place.

Further, it is possible to improve the performance of learning cleaning and increase satisfaction of customers by performing learning cleaning using a learning map that is strong against environmental changes.

In order to achieve the objects described above or other objects, a method of controlling a moving robot according to an aspect of the present disclosure can generate a map that is strong against environmental changes by repeatedly learning various environmental changes such as changes of light, illumination, a time period, and the position of an object.

In order to achieve the objects described above or other objects, a method of controlling a moving robot according to an aspect of the present disclosure can optimize a map by sensing environmental changes and updating the map in accordance with predetermined references.

In order to achieve the objects described above or other objects, a method of controlling a moving robot according to an aspect of the present disclosure can perform efficient learning cleaning based on one map that can cope with various environmental changes.

Figure 18:
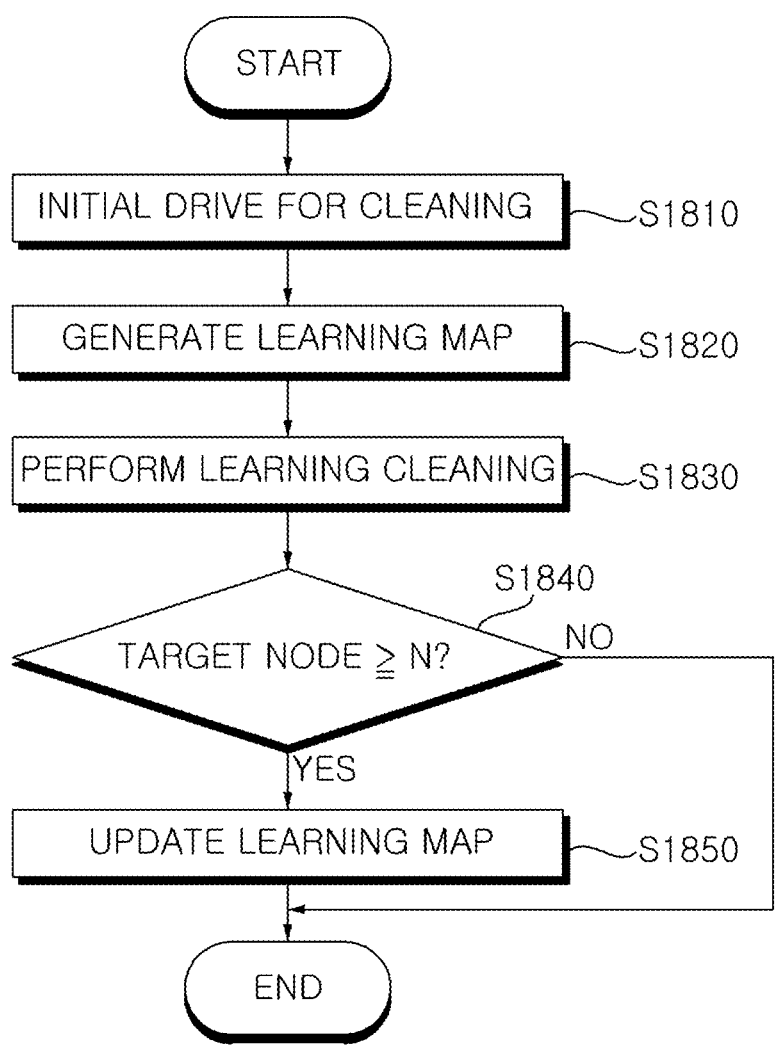
FIG. 18 is a flowchart showing a method of controlling a moving robot according to an embodiment of the present disclosure.

FIG. 18 is a flowchart showing a method of controlling a moving robot according to an embodiment of the present disclosure.

Referring to FIG. 18, while performing a cleaning task, the moving robot 100 can perform initial cleaning traveling (S1810) and generate a learning map based on the initial cleaning traveling (S1820).

A first learning map generated based on the initial cleaning traveling may include the node 1200 exemplified in FIG. 12.

The moving robot 100 can perform learning cleaning while traveling based on the first learning map in the next second traveling (S1830).

When the information acquired through the sensor unit 170, the image acquisition unit 120, etc. in the process of performing the second learning cleaning (S1830) and pre-stored information in the first learning map are the same, the controller 150 can perform position estimation based on the first learning map.

When the information acquired in the process of performing the second learning cleaning and the pre-stored information in the first learning map are not the same, the controller 150 can generate a second learning map by updating the first learning map by additionally registering a node based on the information acquired in the process of performing the second learning cleaning (S1830) on the first learning map (S1850).

The second learning map may include the node 120 generated in the first learning and the node 1300 added in the second learning that are exemplified in FIG. 13. Accordingly, it is possible to generate a map in which the environment of a traveling section and environmental changes are appropriately reflected.

The controller 150 can perform learning cleaning N times. The moving robot 100 can perform learning cleaning while traveling based on the N−1-th learning map in the N-th traveling (S1830).

When the information acquired through the sensor unit 170, the image acquisition unit 120, etc. in the process of performing the N-th learning cleaning (S1830) and pre-stored information in the N−1-th learning map are the same, the controller 150 can perform position estimation based on the N−1-th learning map.

According to the present disclosure, it is possible to improve accuracy in position estimation by performing position estimation based on a learning map updated through several-time learning.

When the information acquired in the process of performing the N-th learning cleaning and the pre-stored information in the N−1-th learning map are not the same, the controller 150 can generate a N-th learning map by updating the N−1-th learning map by additionally registering a node based on the information acquired in the process of performing the N-th learning cleaning (S1830) on the N−1-th learning map (S1850).

Depending on embodiments, the controller 150 may determine whether the number of nodes to be registered is a predetermined number of pieces or more (S1840). In this case, the nodes to be registered may be nodes corresponding to information that is not the same as the pre-stored information in the N−1-th learning map in the information acquired in the process of performing the N-th learning cleaning.

The controller 150 can register the nodes to be registered on the learning map when the number of nodes to be registered is the predetermined number of pieces or more, and if not so, it does not register the nodes to be registered on the learning map, thereby being able to update a map only when an environmental change is a predetermined level or more.

Similar to that described with reference to FIGS. 11 to 17, even in this embodiment, the updating of a learning map (S1850) may include: checking nodes within a predetermined reference distance from a node corresponding to a predetermined position during traveling; determining whether a correlation exists between the nodes within the reference distance and the node corresponding to the predetermined position; determining whether the nodes within the reference distance are nodes of a previously learned map when the correlation does not exist; and registering the node corresponding to the predetermined position on the learning map when determining that the nodes within the reference distance are nodes of the learned map.

Further, the method further includes: determining whether there is a node having a difference of a reference angle or less from the current direction of the robot in the nodes within the reference distance when the correlation exists or when the nodes within the reference distance are not determined as nodes in the map; and registering the node on the map when there is no node having a difference of a reference angle or less from the current direction of the robot, thereby being able to update a map by reflecting meaningful environmental changes.

Further, the method further includes: determining whether the correlation of a node is consistent when there is the node having a difference of a reference angle or less from the current direction of the robot; and not registering a node corresponding to the current position when the correlations of the node corresponding to the predetermined position and the node having a difference of a reference angle or less from the current direction of the robot are consistent, and registering the node on the map when the correlations of the node corresponding to the predetermined position and the node having a difference of a reference angle or less from the current direction of the robot are not consistent, thereby being able to prevent map update due to a small environmental change.

Figure 19:
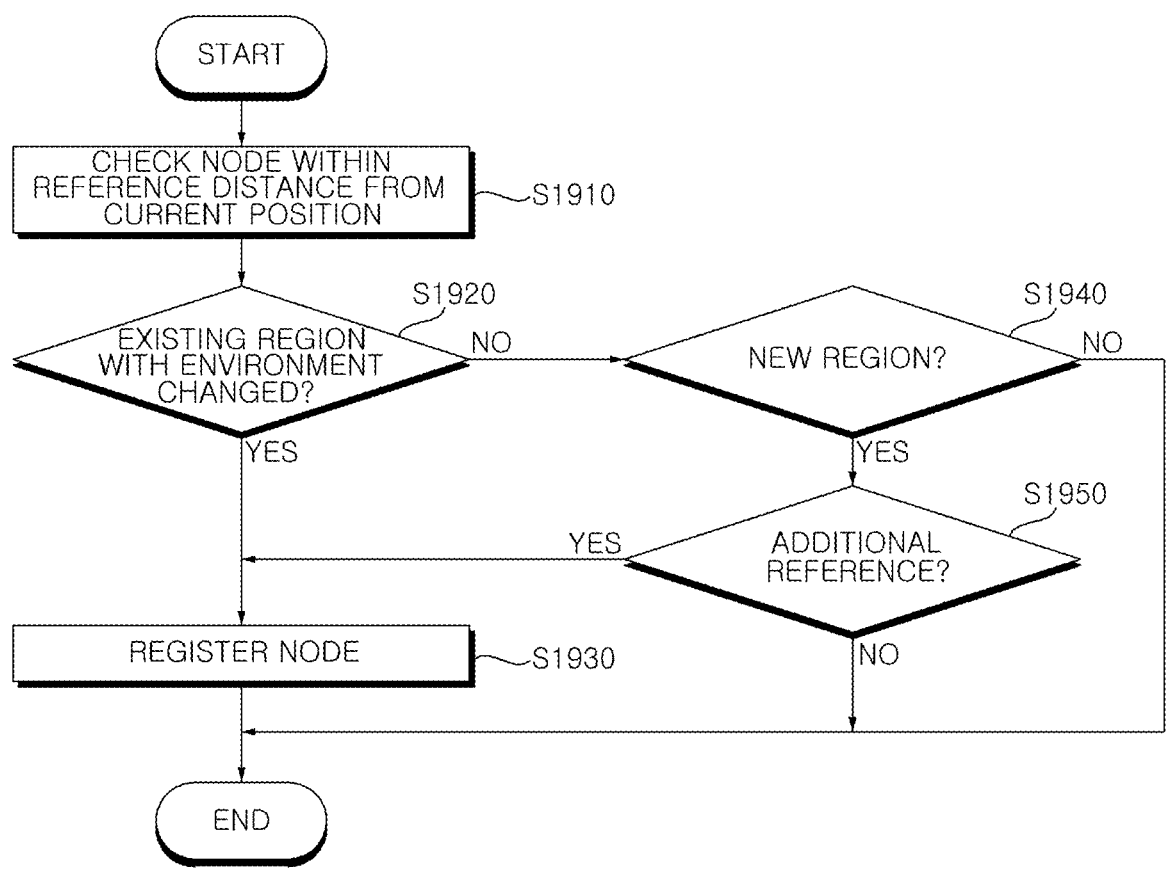
FIG. 19 is a flowchart showing a method of controlling a moving robot according to an embodiment of the present disclosure.

FIG. 19 is a flowchart showing a method of controlling a moving robot according to an embodiment of the present disclosure.

Referring to FIG. 19, the controller 150 of the moving robot 100 can check nodes within a predetermined reference distance from a node corresponding to a current position (S1910). For example, the controller 150 can check and gather nodes within predetermined reference distances such as 30 cm, 50 cm, and 1 m from a node corresponding to the current position.

When the node corresponding to the current position corresponds to an existing region of which the environment has been changed (S1920), the controller 150 can register the node corresponding to the current position on a map (S1930).

In this case, when the node corresponding to the current position does not exist with a node within the reference distance, there is no correlation, and a node within the reference distance is a node of a previously learned map, the controller 150 can determine that it is an existing node with the environment changed.

When these conditions are satisfied (S1920), the controller 150 determines that there have been environmental changes such as changes of light, illumination, and the position of an object in the existing environment and can register the current node on the map (S1930).

Accordingly, it is possible to generate a map in which the environment of a traveling section and environmental changes are appropriately reflected.

Accordingly, it is possible to generate and update a map in which the environment of a traveling section and environmental changes are appropriately reflected.

When the node corresponding to the current position corresponds to a new region (S1940), the controller 150 can determine whether an additional reference is satisfied (S1950).

In this case, when the node corresponding to the current position does not exist with a node within the reference distance, there is no correlation, and a node within the reference distance is not a node of a previously learned map, the controller 150 can determine that it is a new region.

When these conditions are satisfied (S1940), the controller 150 considers that the moving robot has entered a new region and can perform a process of determining whether to register a node as an additional reference according to the new region.

When the additional reference is satisfied, the controller 150 can register the node corresponding to the current position on a map (S1930). Accordingly, it is possible to generate and update a map in which the environment of a traveling section and environmental changes are appropriately reflected.

Meanwhile, the additional reference may include whether there is a node having a difference of a reference angle or less from the current direction of the robot in the nodes within the reference distance.

Meanwhile, the additional reference may include whether correlations of the node corresponding to the current node and the node having a difference of a reference angle or less from the current direction of the robot are consistent.

Accordingly, it is possible to unnecessary update. Further, it is possible to add the node corresponding to the current position while securing alignment with an existing learning map.

The configuration and method of the embodiments described above are not applied to the moving robot according to the present disclosure with limits, some or all of the embodiments may be selectively combined so that the embodiments can be changed in various ways.

Meanwhile, the method of controlling a moving robot according to an embodiment of the present invention may be implemented as a code that a processor can read in a recording medium that the processor can read. The recording medium that a processor can read includes all kinds of recording devices that keep data that can be read by a processor. The recording medium that a processor can read, for example, may be a ROM, a RAM, a CD-ROM, a magnetic tape, a floppy disk, and an optical data storage device, and includes a carrier wave such as transmission through the internet. Further, the recording medium that a processor can read may be distributed to computer systems that are connected through a network and may keep and execute codes that recording medium that a processor can read.

Further, although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

According to at least one of embodiments of the present disclosure, it is possible to generate a map that is strong against environmental changes by repeatedly learning various environmental changes such as changes of light, illumination, a time period, and the position of an object.

Further, according to at least one of embodiments of the present disclosure, it is possible to optimize a map by sensing environmental changes and updating the map in accordance with predetermined references.

Further, according to at least one of embodiments of the present disclosure, it is possible to perform efficient learning cleaning based on one map that can cope with various environmental changes.

Further, according to at least one of embodiments of the present disclosure, it is possible to generate a map to which the environment and environmental changes of a traveling section are appropriately reflected.

Meanwhile, other various effects will be directly or suggestively disclosed in detailed description according to embodiments of the present disclosure to be described below.

What is claimed is:

1. A method of controlling a moving robot, the method comprising:
   checking by a controller, nodes within a predetermined reference distance from a node corresponding to a current position;
   determining, by the controller, whether there is a correlation between the nodes within the reference distance and the node corresponding to the current position;
   determining, by the controller, whether the nodes within the reference distance are nodes of a previously learned map when there is no correlation between the nodes within the reference distance and the node corresponding to the current position; and
   registering, by the controller, the node corresponding to the current position on the map when the nodes within the reference distance are determined as nodes of the previously learned map,
   wherein, when determining whether there is a correlation between the nodes within the reference distance and the node corresponding to the current position, the controller determines whether there is feature matching of the current node with the nodes within the reference distance,
   wherein, when determining whether the nodes within the reference distance are nodes of the previously learned map, the controller checks whether the nodes within the reference distance are nodes existing on the previously learned map accumulated and generated until previous (n-1-th) learning when at least one of the nodes within the reference distance is learned n times (n>=2), and
   wherein the method further comprises:
      determining whether there is a node having a difference of a reference angle or less from a current direction of the robot in the nodes within the reference distance when there is a correlation or when the nodes within the reference distance are not determined as nodes of the map;
      when there is no node having a difference of the reference angle or less from the current direction of the robot, registering the node on the map; and
      when there are nodes having a difference of the reference angle or less from the current direction of the robot, determining whether the correlations of the node are consistent.

2. The method of claim 1, further comprising, when correlations of the node corresponding to the current position and a node having a difference of the reference angle or less from the current direction of the robot are not consistent, registering the node on the map.

3. The method of claim 1, further comprising, when correlations of the node corresponding to the current position and a node having a difference of the reference angle or less from the current direction of the robot are consistent, not registering the node corresponding to the current position on the map.

4. The method of claim 1, further comprising:
   determining a travel path for the moving robot based on the map.

5. A method of controlling a moving robot, the method comprising:
   generating by a controller, a learning map based on initial traveling;
   performing by the controller, learning while the moving robot travels based on the learning map;
   performing by the controller, position estimation based on the learning map when information acquired in the performing of the learning corresponds to pre-stored information in the learning map; and updating by the controller, the learning map by additionally registering a node based on the information acquired in the performing of the learning on the learning map when the information acquired in the performing of the learning does not correspond to the pre-stored information in the learning map, wherein the updating of the learning map includes:
  checking nodes within a predetermined reference distance from a node corresponding to a predetermined position during traveling;
  determining whether there is a correlation between the nodes within the reference distance and the node corresponding to the predetermined position;
  determining whether the nodes within the reference distance are nodes of a previously learned learning map when there is no correlation; and
  registering the node corresponding to the predetermined position on the learning map when the nodes within the reference distance are determined as nodes of the learning map, wherein, in determining whether there is a correlation between the nodes within the reference distance and the node corresponding to the predetermined position, the controller determines whether there is feature matching of the node corresponding to the predetermined position with the nodes within the reference distance, wherein, in the determining whether the nodes within the reference distance are nodes of the previously learned learning map, the controller checks whether the nodes within the reference distance are nodes existing on the previously learned learning map accumulated and generated until previous (n-1-th) learning when one of the nodes within the reference distance is learned n times (n>=2), and wherein the method further comprises:
  determining whether there is a node having a difference of a reference angle or less from a current direction of the robot in the nodes within the reference distance when there is a correlation or when the nodes within the reference distance are not determined as nodes of the map;
  when there is no node having a difference of the reference angle or less from the current direction of the robot, registering the node on the map; and
  when there are nodes having a difference of the reference angle or less from the current direction of the robot, determining whether the correlations of the node are consistent.

6. The method of claim 5, wherein the updating of the learning map is to register nodes to be registered on the learning map when the number of the nodes to be registered is a predetermined number of pieces or more, and is not to register the nodes to be registered on the learning map, if not so.

7. The method of claim 5, further comprising performing position estimation based on the updated learning map.

8. The method of claim 5, further comprising not registering the node corresponding to the current position on the map when correlations of the node corresponding to the predetermined position and a node having a difference of the reference angle or less from the current direction of the robot are consistent, and registering the node on the map when correlations of the node corresponding to the predetermined position and a node having a difference of the reference angle or less from the current direction of the robot are not consistent.

9. The method of claim 5, further comprising:
determining a travel path for the moving robot based on learning map.

* * * * *